(12) United States Patent
Nagami

(10) Patent No.: US 11,280,980 B2
(45) Date of Patent: Mar. 22, 2022

(54) ZOOM LENS AND IMAGING APPARATUS HAVING FOUR LENS GROUPS

(71) Applicant: FUJIFILM Corporation, Tokyo (JP)

(72) Inventor: Ryosuke Nagami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/490,890

(22) Filed: Sep. 30, 2021

(65) Prior Publication Data

US 2022/0019055 A1  Jan. 20, 2022

Related U.S. Application Data

(63) Continuation of application No. 17/344,866, filed on Jun. 10, 2021, which is a continuation of application (Continued)

(30) Foreign Application Priority Data

Aug. 24, 2017 (JP) .............................. JP2017-161263

(51) Int. Cl.
  *G02B 15/177* (2006.01)
  *G02B 9/34* (2006.01)
  (Continued)

(52) U.S. Cl.
  CPC ................. *G02B 9/34* (2013.01); *G02B 7/14* (2013.01); *G02B 15/142* (2019.08);
  (Continued)

(58) Field of Classification Search
  CPC .......... G02B 9/34; G02B 7/14; G02B 15/142; G02B 15/144511; G02B 15/177;
  (Continued)

(56) References Cited

U.S. PATENT DOCUMENTS 10,739,555 B2    8/2020 Nagami
2010/0053767 A1  3/2010 Katakura
(Continued)

FOREIGN PATENT DOCUMENTS

CN    103513408 A    1/2014
CN    104423025 A    3/2015
(Continued)

OTHER PUBLICATIONS

An Office Action mailed by China National Intellectual Property Administration dated Jun. 23, 2021 which corresponds to Chinese Patent Application No. 201810963604.4 and is related to U.S. Appl. No. 17/344,866 with English language translation.
(Continued)

*Primary Examiner* — Balram T Parbadia
(74) *Attorney, Agent, or Firm* — Studebaker & Brackett PC

(57) ABSTRACT

The zoom lens consists of, in order from the object side, a first lens group that has a negative refractive power; a second lens group that has a positive refractive power; a third lens group that has a negative refractive power; and a fourth lens group that has a positive refractive power. During zooming, in each lens group, distances between the adjacent groups in the direction of the optical axis are changed. The first lens group consists of, in order from the object side, a first lens having a negative refractive power, a second lens having a negative refractive power, and a third lens having a positive refractive power. The third lens group consists of a negative lens. During focusing, only the third lens group moves along the optical axis. The zoom lens satisfies predetermined conditional expressions.

6 Claims, 16 Drawing Sheets

Related U.S. Application Data

No. 16/915,763, filed on Jun. 29, 2020, which is a continuation of application No. 16/108,622, filed on Aug. 22, 2018, now Pat. No. 10,739,555.

(51) Int. Cl.

| | | |
|---|---|---|
| *G02B 27/00* | (2006.01) | |
| *H04N 5/225* | (2006.01) | |
| *G02B 7/14* | (2021.01) | |
| *G02B 27/64* | (2006.01) | |
| *G02B 15/14* | (2006.01) | |
| *G02B 13/00* | (2006.01) | |

(52) U.S. Cl.
CPC .... *G02B 15/144511* (2019.08); *G02B 15/177* (2013.01); *G02B 27/0037* (2013.01); *G02B 27/646* (2013.01); *H04N 5/2254* (2013.01); *G02B 13/009* (2013.01)

(58) Field of Classification Search
CPC .............. G02B 27/0037; G02B 27/646; G02B 13/009; H04N 5/2254
See application file for complete search history.

(56) References Cited

U.S. PATENT DOCUMENTS

| | | | |
|---|---|---|---|
| 2012/0162779 | A1 | 6/2012 | Imaoka |
| 2012/0307372 | A1 | 12/2012 | Ichikawa et al. |
| 2013/0027585 | A1 | 1/2013 | Souma |
| 2013/0335616 | A1 | 12/2013 | Hosoi |
| 2014/0098253 | A1 | 4/2014 | Maetaki |
| 2014/0375870 | A1 | 12/2014 | Kawamura et al. |
| 2015/0070520 | A1 | 3/2015 | Hagiwara |
| 2015/0077859 | A1 | 3/2015 | Kanetaka et al. |
| 2015/0237266 | A1 | 8/2015 | Ichikawa et al. |
| 2015/0281588 | A1 | 10/2015 | Izuhara et al. |
| 2015/0316753 | A9 | 11/2015 | Hosoi |
| 2016/0341939 | A1 | 11/2016 | Koida |
| 2018/0113286 | A1* | 4/2018 | Minefuji ........ G02B 15/143507 |
| 2019/0049694 | A1 | 2/2019 | Masugi |
| 2021/0311287 | A1 | 10/2021 | Nagami |

FOREIGN PATENT DOCUMENTS

| | | | |
|---|---|---|---|
| JP | 2012-133230 | A | 7/2012 |
| JP | 2013-015778 | A | 1/2013 |
| JP | 2013-242501 | A | 12/2013 |
| JP | 2013-257497 | A | 12/2013 |
| JP | 2014-077867 | A | 5/2014 |
| JP | 2014-157168 | A | 8/2014 |
| JP | 2015-004880 | A | 1/2015 |
| JP | 2015-031951 | A | 2/2015 |
| JP | 2015-034892 | A | 2/2015 |
| JP | 2015-059997 | A | 3/2015 |
| JP | 2015-079238 | A | 4/2015 |
| JP | 2015-121768 | A | 7/2015 |
| KR | 10-2011-0108840 | A | 10/2011 |
| WO | 2014/087855 | A1 | 6/2014 |

OTHER PUBLICATIONS

An Office Action issued by the United States Patent and Trademark Office dated Aug. 2, 2021, which corresponds to U.S. Appl. No. 16/915,763 and is related to U.S. Appl. No. 17/344,866.

An Office Action; "Notice of Reasons for Refusal," mailed by the Japanese Patent Office dated Jun. 9, 2020, which corresponds to Japanese Patent Application No. 2017-161263 and is related to U.S. Appl. No. 16/108,622; with English language translation.

An Office Action; "Notice of Reasons for Refusal," mailed by the Japanese Patent Office dated Dec. 14, 2021, which corresponds to Japanese Patent Application No. 2020-191852 and is related to U.S. Appl. No. 17/490,890 with English translation.

An Office Action mailed by the United States Patent and Trademark Office dated Nov. 30, 2021, which corresponds to U.S. Appl. No. 17/490,890 and is related to U.S. Appl. No. 17/490,890.

* cited by examiner

EXAMPLE 1

EXAMPLE 2

EXAMPLE 3

EXAMPLE 4

EXAMPLE 5

EXAMPLE 1

EXAMPLE 2

EXAMPLE 2

EXAMPLE 3

EXAMPLE 3

EXAMPLE 4

EXAMPLE 4

EXAMPLE 5

EXAMPLE 5

ZOOM LENS AND IMAGING APPARATUS HAVING FOUR LENS GROUPS

CROSS-REFERENCE TO RELATED APPLICATIONS

The present application is a Continuation of U.S. patent application Ser. No. 17/344,866 filed Jun. 10, 2021, which is a Continuation of U.S. patent application Ser. No. 16/915,763 filed Jun. 29, 2020, which is a Continuation of U.S. patent application Ser. No. 16/108,622 filed Aug. 22, 2018, which claims priority under 35 U.S.C. § 119 to Japanese Patent Application No. 2017-161263 filed on Aug. 24, 2017. The above application is hereby expressly incorporated by reference, in its entirety, into the present application.

BACKGROUND OF THE INVENTION

1. Field of the Invention

The present invention relates to a zoom lens, which is particularly suitable for imaging apparatuses such as a digital camera, an interchangeable lens digital camera, and a movie imaging camera, and an imaging apparatus comprising the zoom lens.

2. Description of the Related Art

As zoom lenses used for imaging apparatuses such as digital cameras, interchangeable lens digital cameras, and movie imaging cameras, zoom lenses described in JP2015-121768A, JP2014-77867A, and JP2015-4880A are known.

In the zoom lens used for the imaging apparatuses, there is a demand to achieve reduction in size and weight in order to improve portability. In addition, there are demands for high speed focusing, favorable optical performance over the entire imaging distance, and an increase in angle of view at the wide-angle end state.

SUMMARY OF THE INVENTION

However, in the zoom lenses disclosed in JP2015-121768A and JP2014-77867A, while a wide angle of view and high speed focusing are achieved, the lens group closest to the object side (the first lens group) is large. Thus, it can not be said that reduction in size is sufficiently achieved.

In the zoom lens disclosed in JP2015-4880A, it can not be said that compatibility with suppression of fluctuation in aberrations caused by the imaging distance is satisfactorily achieved while achieving reduction in size and high speed focusing.

The present invention has been made in consideration of the above-mentioned situations, and it is an object of the present invention to provide a zoom lens which is capable of achieving high optical performance over the entire object distance with little fluctuation in aberrations caused by the object distance while being able to perform high speed focusing with a small size and a lightweight as a whole, and an imaging apparatus comprising the zoom lens.

A first zoom lens of the present invention consists of, in order from an object side: a first lens group that has a negative refractive power; a second lens group that has a positive refractive power; a third lens group that has a negative refractive power; and a fourth lens group that has a positive refractive power. During zooming, distances between adjacent groups of the first lens group, the second lens group, the third lens group, and the fourth lens group in a direction of an optical axis are changed. The first lens group consists of, in order from the object side, a first lens having a negative refractive power, a second lens having a negative refractive power, and a third lens having a positive refractive power. The third lens group consists of a negative lens. During focusing, only the third lens group moves along the optical axis. Assuming that a refractive index of the first lens is Nd1, an Abbe number of the first lens is vd1, a refractive index of the third lens is Nd3, an Abbe number of the third lens is vd3, a focal length of the whole system during focusing on an object at infinity at the wide-angle end is fw, a focal length of the third lens group is f3, a back focal length is Bf, and a maximum image height is IH, Conditional Expressions (1) to (4) are satisfied.

$1.7 < Nd1 - 0.0037 \times vd1 < 2$ (1)

$1.8 < Nd3 - 0.0037 \times vd3 < 2$ (2)

$-0.6 < fw/f3 < -0.15$ (3)

$0.6 < Bf/IH < 1.2$ (4)

A second zoom lens of the present invention consists of, in order from an object side: a first lens group that has a negative refractive power; a second lens group that has a positive refractive power; a third lens group that has a negative refractive power; and a fourth lens group that has a positive refractive power. During zooming, distances between adjacent groups of the first lens group, the second lens group, the third lens group, and the fourth lens group in a direction of an optical axis are changed. The first lens group consists of, in order from the object side, a first lens having a negative refractive power, a second lens having a negative refractive power, and a third lens having a positive refractive power. The third lens group consists of a negative lens. During focusing, only the third lens group moves along the optical axis. Assuming that a refractive index of the first lens is Nd1, an Abbe number of the first lens is vd1, a refractive index of the third lens is Nd3, an Abbe number of the third lens is vd3, a focal length of the whole system during focusing on an object at infinity at the wide-angle end is fw, a focal length of the third lens group is f3, a back focal length is Bf, and a focal length of the fourth lens group is f4, Conditional Expressions (1) to (3) and (5) are satisfied.

$1.7 < Nd1 - 0.0037 \times vd1 < 2$ (1)

$1.8 < Nd3 - 0.0037 \times vd3 < 2$ (2)

$-0.6 < fw/f3 < -0.15$ (3)

$0.15 < Bf/f4 < 0.35$ (5)

In the first and second zoom lenses of the present invention, among Conditional Expression (1-1) to (3-1), it is preferable to satisfy at least one or more.

$1.75 < Nd1 - 0.0037 \times vd1 < 2$ (1-1)

$1.85 < Nd3 - 0.0037 \times vd3 < 2$ (2-1)

$-0.5 < fw/f3 < -0.2$ (3-1)

In the first zoom lens of the present invention, it is preferable to satisfy Conditional Expression (4-1).

$0.7 < Bf/IH < 1.1$ (4-1)

In the second zoom lens of the present invention, it is preferable to satisfy Conditional Expression (5-1).

$0.18 < Bf/f4 < 0.3$ (5-1)

In the first and second zoom lenses of the present invention, it is preferable that the second lens group has a vibration reduction lens group that performs vibration reduction by moving in a direction orthogonal to the optical axis. In addition, assuming that a focal length of the whole system during focusing on an object at infinity at the telephoto end is ft and a focal length of the vibration reduction lens group is fois, it is preferable to satisfy Conditional Expression (6), and it is more preferable to satisfy Conditional Expression (6-1).

$$0.5 < ft/fois < 2 \quad (6)$$

$$1 < ft/fois < 1.5 \quad (6\text{-}1)$$

It is preferable that the second lens group has a vibration reduction lens group that performs vibration reduction by moving in a direction orthogonal to the optical axis, and it is preferable that the vibration reduction lens group consists of one lens.

In this case, assuming that an Abbe number of a lens composing the vibration reduction lens group is vud, it is preferable to satisfy Conditional Expression (7), and it is more preferable to satisfy Conditional Expression (7-1).

$$50 < vud < 100 \quad (7)$$

$$55 < vud < 95 \quad (7\text{-}1)$$

It is preferable that the second lens group has a stop, and has lenses adjacent to the object side and the image side of the stop.

In this case, it is preferable that the second lens group has, successively in order from the object side, a positive lens and the stop.

It is preferable that the second lens group has a cemented lens consisting of at least one positive lens and at least one negative lens on the image side of the stop.

In this case, it is preferable that the cemented lens consists of one positive lens and one negative lens. Assuming that a difference (between an Abbe number of the positive lens and an Abbe number of the negative lens) between Abbe numbers of the positive lens and the negative lens composing the cemented lens is Δvcd, it is preferable to satisfy Conditional Expression (8).

$$15 < \Delta vcd < 60 \quad (8)$$

It is preferable that the fourth lens group consists of a positive lens.

The fourth lens group may remain stationary during zooming, and the fourth lens group may move during zooming.

An imaging apparatus of the present invention comprises the above-mentioned zoom lens of the present invention.

It should be noted that the term "consists of ~" means that the imaging lens may include not only the above-mentioned elements but also lenses substantially having no refractive powers, optical elements, which are not lenses, such as a stop, a mask, a cover glass, and a filter, and mechanism parts such as a lens flange, a lens barrel, an imaging element, and a camera shaking correction mechanism.

Further, the refractive index and the Abbe number in each conditional expression are based on the d line as the reference wavelength.

Further, surface shapes, signs of refractive powers, radii of curvature of the lenses are assumed as those in paraxial regions in a case where some lenses have aspherical surfaces.

According to the first and second zoom lenses of the present invention, the zoom lens consists of, in order from an object side: a first lens group that has a negative refractive power; a second lens group that has a positive refractive power; a third lens group that has a negative refractive power; and a fourth lens group that has a positive refractive power. During zooming, distances between adjacent groups of the first lens group, the second lens group, the third lens group, and the fourth lens group in a direction of an optical axis are changed. The first lens group consists of, in order from the object side, a first lens having a negative refractive power, a second lens having a negative refractive power, and a third lens having a positive refractive power. The third lens group consists of a negative lens. During focusing, only the third lens group moves along the optical axis. With such a configuration, the zoom lens satisfies predetermined conditional expressions. Therefore, it is possible to provide a zoom lens, which is capable of achieving high optical performance over the entire object distance with little fluctuation in aberrations caused by the object distance while being able to perform high speed focusing with a small size and a lightweight as a whole, and an imaging apparatus comprising the zoom lens.

DESCRIPTION OF THE PREFERRED EMBODIMENTS

Figure 1:
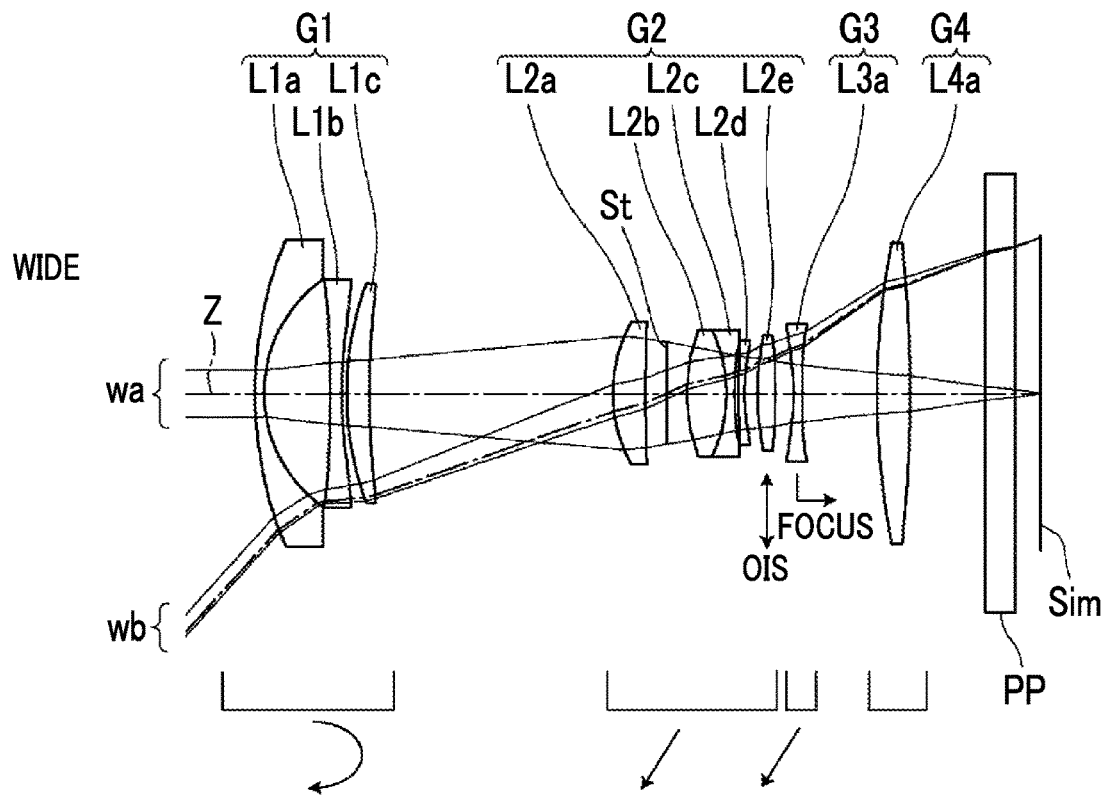
FIG. 1 is a cross-sectional view illustrating a lens configuration of a zoom lens (common to Example 1) according to first and second embodiments of the present invention.
Figure 1:
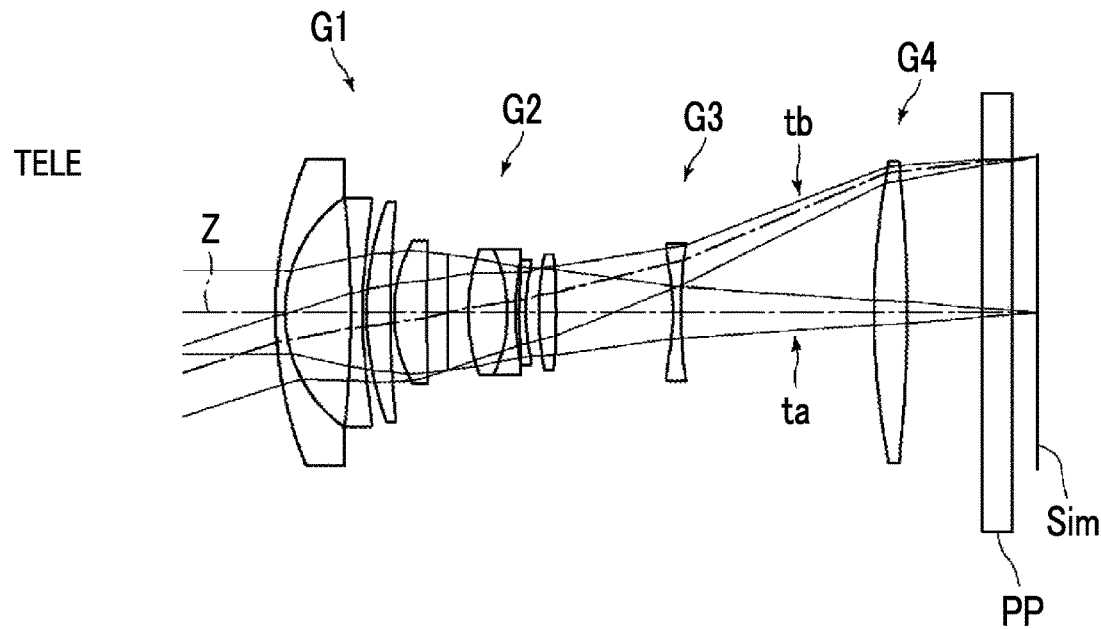

Hereinafter, a first embodiment of the present invention will be described with reference to the drawing. FIG. 1 is a cross-sectional view illustrating a lens configuration of a zoom lens according to a first embodiment of the present invention. The exemplary configuration shown in FIG. 1 is the same as the configuration of the zoom lens of Example 1. In FIG. 1, the left side is an object side, and the right side is an image side. In addition, an aperture stop St shown in the drawing does not necessarily show its real size and shape, but show a position on an optical axis Z.

In FIG. 1, aberrations in the wide-angle end state are shown in the upper part indicated by "WIDE", on-axis rays wa and rays with the maximum angle of view wb are shown as rays. In addition, aberrations in the telephoto end state are shown in the lower part indicated by "TELE", and on-axis rays ta and rays with the maximum angle of view tb are shown as rays. All of these show a state in which the object at infinity is in focus. In addition, the movement locus of each lens group during zooming is also shown.

In order to mount the zoom lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The zoom lens of the present embodiment consists of, in order from the object side: a first lens group G1 that has a negative refractive power; a second lens group G2 that has a positive refractive power; a third lens group G3 that has a negative refractive power; and a fourth lens group G4 that has a positive refractive power. During zooming, distances between adjacent groups of the first lens group G1, the second lens group G2, the third lens group G3, and the fourth lens group G4 in the direction of the optical axis Z are changed. In such a manner, by providing the first lens group G1 closest to the object side with a negative refractive power, divergent light is incident into the succeeding lens group, and there is an advantage in ensuring the amount of peripheral light. Further, by providing the third lens group G3 with a negative refractive power, the rays can be reduced, and there is an advantage in reducing the diameter.

The first lens group G1 consists of, in order from the object side, a first lens L1$a$ having a negative refractive power, a second lens L1$b$ having a negative refractive power, and a third lens L1$c$ having a positive refractive power. By making an entrance pupil closer to the object side in the first lens L1$a$ having a negative refractive power, it contributes to ensuring the angle of view at the wide angle end and reducing the diameter. In addition, by disposing the second lens L1$b$ having a negative refractive power and the third lens L1$c$ having a positive refractive power succes-sively, it is possible to suppress the spherical aberration at the telephoto end, and to suppress fluctuation in aberrations during zooming in the entire first lens group G1.

The third lens group G3 consists of a negative lens L3$a$. During focusing, only the third lens group G3 moves along the optical axis Z. That is, the third lens group G3 functions as a focusing lens group FOCUS. Such a configuration contributes to reduction in size and weight of the focusing units (a focusing lens group FOCUS and a mechanism for moving the focusing lens group FOCUS) and high-speed autofocus.

Assuming that a refractive index of the first lens L1$a$ is Nd1, an Abbe number of the first lens L1$a$ is vd1, a refractive index of the third lens L1$c$ is Nd3, an Abbe number of the third lens L1$c$ is vd3, a focal length of the whole system during focusing on an object at infinity at the wide-angle end is fw, a focal length of the third lens group G3 is f3, a back focal length is Bf, and a maximum image height is IH, the zoom lens is configured to satisfy Conditional Expressions (1) to (4).

$$1.7 < Nd1 - 0.0037 \times vd1 < 2 \tag{1}$$

$$1.8 < Nd3 - 0.0037 \times vd3 < 2 \tag{2}$$

$$-0.6 < fw/f3 < -0.15 \tag{3}$$

$$0.6 < Bf/IH < 1.2 \tag{4}$$

By not allowing the result of Conditional Expression (1) to be equal to or greater than the upper limit, there is an advantage in correcting chromatic aberration. By not allowing the result of Conditional Expression (1) to be equal to or less than the lower limit, there is an advantage in achieving reduction in size and weight. In addition, in a case where Conditional Expression (1-1) is satisfied, it is possible to obtain more favorable characteristics.

$$1.75 < Nd1 - 0.0037 \times vd1 < 2 \tag{1-1}$$

By not allowing the result of Conditional Expression (2) to be equal to or greater than the upper limit, there is an advantage in correcting chromatic aberration. By not allowing the result of Conditional Expression (2) to be equal to or less than the lower limit, there is an advantage in achieving reduction in size and weight. In addition, in a case where Conditional Expression (2-1) is satisfied, it is possible to obtain more favorable characteristics.

$$1.85 < Nd3 - 0.0037 \times vd3 < 2 \tag{2-1}$$

By not allowing the result of Conditional Expression (3) to be equal to or greater than the upper limit, it is possible to prevent the refractive power of the third lens group G3 from becoming excessively weak. Thus, the amount of movement of the third lens group G3 during focusing is minimized. As a result, there is an advantage in achieving reduction in size. By not allowing the result of Conditional Expression (3) to be equal to or less than the lower limit, it is possible to prevent the refractive power of the third lens group G3 from becoming excessively strong. As a result, there is an advantage in minimizing the amount of fluctuation in aberrations during focusing. In addition, in a case where Conditional Expression (3-1) is satisfied, it is possible to obtain more favorable characteristics.

$$-0.5 < fw/f3 < -0.2 \tag{3-1}$$

By not allowing the result of Conditional Expression (4) to be equal to or greater than the upper limit, there is an advantage in reducing the size thereof. There is an advantage in minimizing the angle of incidence of the principal ray of off-axis rays to the image plane Sim on the wide-angle side. By not allowing the result of Conditional Expression (4) to be equal to or less than the lower limit, the zoom lens and the image plane Sim are prevented from becoming excessively close. As a result, there is an advantage in reducing the diameter of the lens. In addition, in a case where Conditional Expression (4-1) is satisfied, it is possible to obtain more favorable characteristics.

$$0.7 < Bf/IH < 1.1 \quad (4\text{-}1)$$

Next, a second embodiment of the present invention will be described. A lens configuration of the zoom lens according to the second embodiment is the same as that of the zoom lens according to the first embodiment shown in FIG. 1.

The zoom lens of the present embodiment consists of, in order from the object side: a first lens group G1 that has a negative refractive power; a second lens group G2 that has a positive refractive power; a third lens group G3 that has a negative refractive power; and a fourth lens group G4 that has a positive refractive power. During zooming, distances between adjacent groups of the first lens group G1, the second lens group G2, the third lens group G3, and the fourth lens group G4 in the direction of the optical axis Z are changed.

The first lens group G1 consists of, in order from the object side, a first lens L1a having a negative refractive power, a second lens L1b having a negative refractive power, and a third lens L1c having a positive refractive power.

The third lens group G3 consists of a negative lens L3a. During focusing, only the third lens group G3 moves along the optical axis Z.

Assuming that a refractive index of the first lens L1a is Nd1, an Abbe number of the first lens L1a is νd1, a refractive index of the third lens L1c is Nd3, an Abbe number of the third lens L1c is νd3, a focal length of the whole system during focusing on an object at infinity at the wide-angle end is fw, a focal length of the third lens group G3 is f3, a back focal length is Bf, and a focal length of the fourth lens group G4 is f4, the zoom lens is configured to satisfy Conditional Expressions (1) to (3) and (5).

$$1.7 < Nd1 - 0.0037 \times \nu d1 < 2 \quad (1)$$

$$1.8 < Nd3 - 0.0037 \times \nu d3 < 2 \quad (2)$$

$$-0.6 < fw/f3 < -0.15 \quad (3)$$

$$0.15 < Bf/f4 < 0.35 \quad (5)$$

Compared to the zoom lens according to the first embodiment, the zoom lens according to the second embodiment is configured to satisfy Conditional Expression (5) instead of Conditional Expression (4), and the other configuration is the same. Hence, only Conditional Expression (5) will be described.

By not allowing the result of Conditional Expression (5) to be equal to or greater than the upper limit, it is possible to prevent the back focal length from becoming excessively long or it is possible to prevent the refractive power of the fourth lens group G4 from becoming excessively strong. As a result, it is possible to prevent the negative refractive power of the adjacent third lens group G3 from becoming excessively strong. Thus, there is an advantage in suppressing fluctuation in aberrations during focusing. By not allowing the result of Conditional Expression (5) to be equal to or less than the lower limit, it is possible to prevent the back focal length from becoming excessively short or it is possible to prevent the refractive power of the fourth lens group G4 from becoming excessively weak. As a result, it is possible to prevent the negative refractive power of the adjacent third lens group G3 from becoming excessively weak. Thus, the amount of movement of the third lens group G3 during focusing is minimized, and there is an advantage in achieving reduction in size. In addition, in a case where Conditional Expression (5-1) is satisfied, it is possible to obtain more favorable characteristics.

$$0.18 < Bf/f4 < 0.3 \quad (5\text{-}1)$$

In the zoom lens according to the first and second embodiments, the second lens group G2 has a vibration reduction lens group OIS that performs vibration reduction by moving in the direction orthogonal to the optical axis Z. Assuming that a focal length of the whole system during focusing on an object at infinity at the telephoto end is ft and a focal length of the vibration reduction lens group OIS is fois, it is preferable to satisfy Conditional Expression (6). By not allowing the result of Conditional Expression (6) to be equal to or greater than the upper limit, it is possible to prevent the refractive power of the vibration reduction lens group OIS from becoming excessively strong. As a result, it is possible to reduce fluctuation in aberrations during vibration reduction. By not allowing the result of Conditional Expression (6) to be equal to or less than the lower limit, it is possible to prevent the amount of movement of the vibration reduction lens group OIS from becoming excessively large. Thus, the size of the entire zoom lens and the vibration reduction units (the vibration reduction lens group OIS and the mechanism for moving the vibration reduction lens group OIS). In addition, in a case where Conditional Expression (6-1) is satisfied, it is possible to obtain more favorable characteristics.

$$0.5 < ft/fois < 2 \quad (6)$$

$$1 < ft/fois < 1.5 \quad (6\text{-}1)$$

It is preferable that the second lens group G2 has a vibration reduction lens group OIS that performs vibration reduction by moving in a direction orthogonal to the optical axis Z, and it is preferable that the vibration reduction lens group OIS consists of one lens. With such a configuration, there is an advantage in achieving reduction in size and weight of the vibration reduction unit.

In this case, assuming that an Abbe number of a lens composing the vibration reduction lens group OIS is νud, it is preferable to satisfy Conditional Expression (7). By not allowing the result of Conditional Expression (7) to be equal to or greater than the upper limit, it is possible to select a material having a sufficient refractive index. By not allowing the result of Conditional Expression (7) to be equal to or less than the lower limit, there is an advantage in suppressing fluctuation in chromatic aberration during vibration reduction. In addition, in a case where Conditional Expression (7-1) is satisfied, it is possible to obtain more favorable characteristics.

$$50 < \nu ud < 100 \quad (7)$$

$$55 < \nu ud < 95 \quad (7\text{-}1)$$

It is preferable that the second lens group G2 has an aperture stop St, and has lenses adjacent to the object side and the image side of the aperture stop St. With such a configuration, it becomes easy to ensure the amount of movement of the second lens group G2 during zooming, and there is an advantage in achieving reduction in size.

In this case, it is preferable that the second lens group G2 has, successively in order from the object side, a positive lens and the aperture stop St. By disposing the positive lens on the object side of the aperture stop St in such a manner, there is an advantage in achieving reduction in size of the aperture stop St.

It is preferable that the second lens group G2 has a cemented lens consisting of at least one positive lens and at least one negative lens on the image side of the aperture stop St. With such a configuration, there is an advantage in correcting longitudinal chromatic aberration.

In this case, it is preferable that the cemented lens consists of one positive lens and one negative lens. Assuming that a difference (between an Abbe number of the positive lens and an Abbe number of the negative lens) between Abbe numbers of the positive lens and the negative lens composing the cemented lens is Δvcd, it is preferable to satisfy Conditional Expression (8). By satisfying Conditional Expression (8), chromatic aberration in the second lens group G2 can be sufficiently corrected, and there is an advantage in achieving high optical performance. In addition, in a case where Conditional Expression (8-1) is satisfied, it is possible to obtain more favorable characteristics.

$$15 < \Delta vcd < 60 \quad (8)$$

$$20 < \Delta vcd < 50 \quad (8\text{-}1)$$

It is preferable that the fourth lens group G4 consists of a positive lens. With such a configuration, it is possible to improve the balance of fluctuation in aberrations during focusing between the fourth lens group G4 and the third lens group G3, which consists of a negative lens, while ensuring the amount of movement of the third lens group G3 during focusing.

The fourth lens group G4 may remain stationary during zooming, and the fourth lens group G4 may move during zooming. In a case where the fourth lens group G4 remains stationary during zooming, dust can be prevented from entering into the zoom lens. Assuming that the fourth lens group G4 is moved during zooming, there is an advantage in reducing the diameter of the fourth lens group G4.

It is preferable that the surface closest to the image side in the first lens group G1 has a shape convex toward the object side. With such a configuration, it becomes easy to ensure a distance between the first lens group G1 and the second lens group G2 at the telephoto end, and there is an advantage in achieving reduction in size.

In the example shown in FIG. 1, the optical member PP is disposed between the lens system and the image plane Sim. However, various filters such as a lowpass filter and a filter for cutting off a specific wavelength region may not be disposed between the lens system and the image plane Sim. Instead, such various filters may be disposed between the lenses, or coating for functions the same as those of various filters may be performed on a lens surface of any lens.

Next, numerical examples of the zoom lens of the present invention will be described.

First, a zoom lens of Example 1 will be described. FIG. 1 is a cross-sectional view illustrating a lens configuration of the zoom lens of Example 1. In FIG. 1 and FIGS. 2 to 5 corresponding to Examples 2 to 5 to be described later, left sides thereof are the object side, and right sides thereof are the image side. In addition, the aperture stop St shown in the drawings does not necessarily indicate its size or shape, and indicates a position thereof on the optical axis Z. Further, aberrations in the wide-angle end state are shown in the upper part indicated by "WIDE", on-axis rays wa and rays with the maximum angle of view wb are shown as rays. In addition, aberrations in the telephoto end state are shown in the lower part indicated by "TELE", and on-axis rays ta and rays with the maximum angle of view tb are shown as rays. All of these show a state in which the object at infinity is in focus. In addition, the movement locus of each lens group during zooming is also shown.

The zoom lens of Example 1 is composed of, in order from the object side, a first lens group G1 composed of three lenses of lenses L1a to L1c, a second lens group G2 composed of an aperture stop St and five lenses L2a to L2e, a third lens group G3 composed of only one lens L3a, and a fourth lens group G4 composed of only one lens L4a. Further, during zooming, the first lens group G1, the second lens group G2, and the third lens group G3 move, and the fourth lens group G4 remains stationary.

Table 1 shows basic lens data of the zoom lens of Example 1, Table 2 shows data about specification, Table 3 shows data about variable surface distances, and Table 4 shows data about aspheric surface coefficients thereof. Hereinafter, meanings of the reference signs in the tables are, for example, as described in Example 1, and are basically the same as those in Examples 2 to 5.

In the lens data of Table 1, the column of the surface number shows surface numbers. The surface of the elements closest to the object side is the first surface, and the surface numbers sequentially increase toward the image plane side. The column of the radius of curvature shows radii of curvature of the respective surfaces. The column of the surface distance shows distances on the optical axis Z between the respective surfaces and the subsequent surfaces. Further, the column of n shows a refractive index of each optical element at the d line (a wavelength of 587.6 nm (nanometers)), and the column of vd shows an Abbe number of each optical element at the d line (a wavelength of 587.6 nm (nanometers)).

In addition, the sign of the radius of curvature is positive in a case where a surface has a shape convex toward the object side, and is negative in a case where a surface has a shape convex toward the image plane side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during zooming and focusing, DD[surface number] is noted. Numerical values each corresponding to the DD[surface number] are shown in Table 3.

In the data about the specification of Table 2, in each case of focusing on the object at infinity and focusing on the object at a finite distance (focusing on the object at a distance of 1 m from the image plane), values of the zoom magnification, the focal length f', the back focal length Bf', the F number FNo., and the total angle of view 2ω(°) are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 4 shows the surface numbers of the aspheric surfaces and aspheric surface coefficients of the aspheric surfaces. The "E±n" (n: an integer) in numerical values of the aspheric surface coefficients of Table 4 indicates "×10$^{±n}$". The aspheric surface coefficients are values of the coefficients KA and Am in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric surface coefficients, and $\Sigma$ at the aspheric surface depth Zd means a sum with respect to m.

In the basic lens data, the data about specification, and the data about variable surface distances, a degree is used as a unit of an angle, and mm (millimeters) is used as a unit of a length, but appropriate different units may be used since the optical system can be used even in a case where the system is enlarged or reduced in proportion.

TABLE 1

Example 1 Lens Data (n and ν are based on d line)

| Surface Number | Radius of Curvature | Surface Distance | n | ν |
|---|---|---|---|---|
| 1 | 35.567 | 0.87 | 1.95375 | 32.32 |
| 2 | 12.500 | 6.21 | | |
| *3 | −166.657 | 1.13 | 1.53409 | 55.89 |
| *4 | 38.071 | 0.45 | | |
| 5 | 27.460 | 2.20 | 1.94595 | 17.98 |
| 6 | 83.707 | DD[6] | | |
| 7 | 12.775 | 3.12 | 1.60311 | 60.64 |
| 8 | 146.879 | 2.00 | | |
| 9(Stop) | ∞ | 1.96 | | |
| 10 | 15.625 | 3.76 | 1.61800 | 63.33 |
| 11 | −12.500 | 0.75 | 1.67270 | 32.10 |
| 12 | 22.574 | 0.37 | | |
| *13 | 46.279 | 0.62 | 1.88202 | 37.22 |
| *14 | 20.056 | 1.25 | | |
| 15 | 28.405 | 1.62 | 1.51633 | 64.14 |
| 16 | −62.961 | DD[16] | | |
| *17 | −19.477 | 0.83 | 1.51633 | 64.06 |
| *18 | 185.962 | DD[18] | | |
| 19 | 68.556 | 3.12 | 1.89190 | 37.13 |
| 20 | −124.994 | 7.19 | | |
| 21 | ∞ | 2.85 | 1.51633 | 64.14 |
| 22 | ∞ | DD[22] | | |

TABLE 2

Example 1 Specification (d Line)

Focusing on Object at Infinity

| | WIDE | MID | TELE |
|---|---|---|---|
| Zoom Magnification | 1.0 | 1.7 | 2.8 |
| f' | 15.46 | 26.01 | 43.76 |
| Bf' | 11.48 | 11.48 | 11.48 |
| FNo. | 3.56 | 4.22 | 5.76 |
| 2ω[°] | 93.2 | 57.4 | 34.6 |

Focusing on Object at Finite Distance

| | WIDE | MID | TELE |
|---|---|---|---|
| Zoom Magnification | 1.0 | 1.7 | 2.8 |
| f' | 15.39 | 25.80 | 43.12 |
| Bf' | | | |
| FNo. | 3.57 | 4.24 | 5.80 |
| 2ω[°] | 93.0 | 57.0 | 34.2 |

TABLE 3

Example 1 Moved Surface Distance

Focusing of Object at Infinity

| | WIDE | MID | TELE |
|---|---|---|---|
| DD[6] | 23.03 | 9.72 | 0.39 |
| DD[16] | 1.78 | 4.47 | 10.98 |
| DD[18] | 7.09 | 13.52 | 18.32 |
| DD[22] | 2.41 | 2.41 | 2.41 |

Focusing on Object at Finite Distance

| | WIDE | MID | TELE |
|---|---|---|---|
| DD[6] | 23.03 | 9.72 | 0.39 |
| DD[16] | 2.01 | 4.96 | 12.14 |
| DD[18] | 6.87 | 13.04 | 17.16 |
| DD[22] | 2.41 | 2.41 | 2.41 |

TABLE 4

Example 1 Aspheric surface coefficient

| Surface Number | 3 | 4 | 13 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −1.0819127E−06 | −3.3952932E−05 | 8.5098274E−05 |
| A5 | −2.7488812E−05 | −1.4238550E−05 | −2.1605954E−04 |
| A6 | 7.4995863E−06 | 3.0228297E−06 | 4.8035406E−05 |
| A7 | −7.4607015E−07 | −2.1440511E−08 | 3.9492842E−06 |
| A8 | 4.6610516E−09 | −3.8153342E−08 | −2.6191475E−06 |
| A9 | 3.0046511E−09 | 4.5511579E−10 | 1.0747465E−07 |
| A10 | 6.2089220E−11 | 3.1775888E−10 | 2.8434370E−08 |
| A11 | −6.3379780E−12 | 1.1477360E−11 | 8.1291461E−09 |
| A12 | −2.4856103E−12 | −1.9466172E−12 | −2.9346471E−10 |
| A13 | 7.9952646E−14 | −1.9010929E−13 | 2.3142358E−10 |
| A14 | 8.8179053E−15 | 9.6733898E−17 | −1.4036485E−10 |
| A15 | 6.0132523E−16 | 9.0411570E−16 | −4.2763386E−11 |
| A16 | −7.0790962E−17 | 9.8969392E−17 | 3.2611479E−12 |
| A17 | −1.2696757E−18 | 5.5661862E−18 | 1.0713169E−12 |
| A18 | 3.4642064E−20 | −6.2944607E−19 | 3.4062175E−13 |
| A19 | 2.5015608E−21 | −1.3072020E−19 | 1.0842981E−14 |
| A20 | 3.0930873E−22 | 8.4295392E−21 | −1.3785869E−14 |

| Surface Number | 14 | 17 | 18 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 1.5046514E−04 | 5.7641026E−04 | 8.1004504E−04 |
| A5 | −1.2516791E−04 | −2.7728125E−05 | −1.9325677E−04 |
| A6 | 2.4421887E−05 | −3.4579663E−05 | 1.7703556E−05 |
| A7 | −5.9473522E−06 | 5.3393233E−06 | 2.1921002E−07 |
| A8 | 2.2055101E−06 | 7.5317973E−07 | 3.8441652E−08 |
| A9 | 1.4547064E−07 | −5.2588119E−08 | 2.3388266E−09 |
| A10 | −6.3015199E−08 | −2.8797238E−08 | 4.4167732E−10 |
| A11 | −2.4112190E−08 | −4.8567333E−10 | −1.5401166E−09 |
| A12 | −2.5506144E−11 | 3.4857371E−10 | −1.5864859E−10 |
| A13 | 4.3154271E−10 | 5.8918446E−12 | 1.7299766E−11 |
| A14 | 2.8773343E−10 | 8.0798376E−12 | 9.6678206E−12 |
| A15 | 8.6474993E−12 | −2.8705432E−13 | 1.4745553E−12 |
| A16 | −6.7223012E−12 | 2.5937199E−13 | −2.9769134E−13 |
| A17 | −3.4492574E−12 | −5.1917695E−14 | −3.2894801E−14 |
| A18 | 1.8172586E−13 | −3.6107148E−15 | −1.3045407E−15 |
| A19 | 1.7824842E−13 | −6.3184282E−16 | 1.2657422E−15 |
| A20 | −2.0542773E−14 | 1.6925973E−16 | −7.0673211E−17 |

Figure 6:
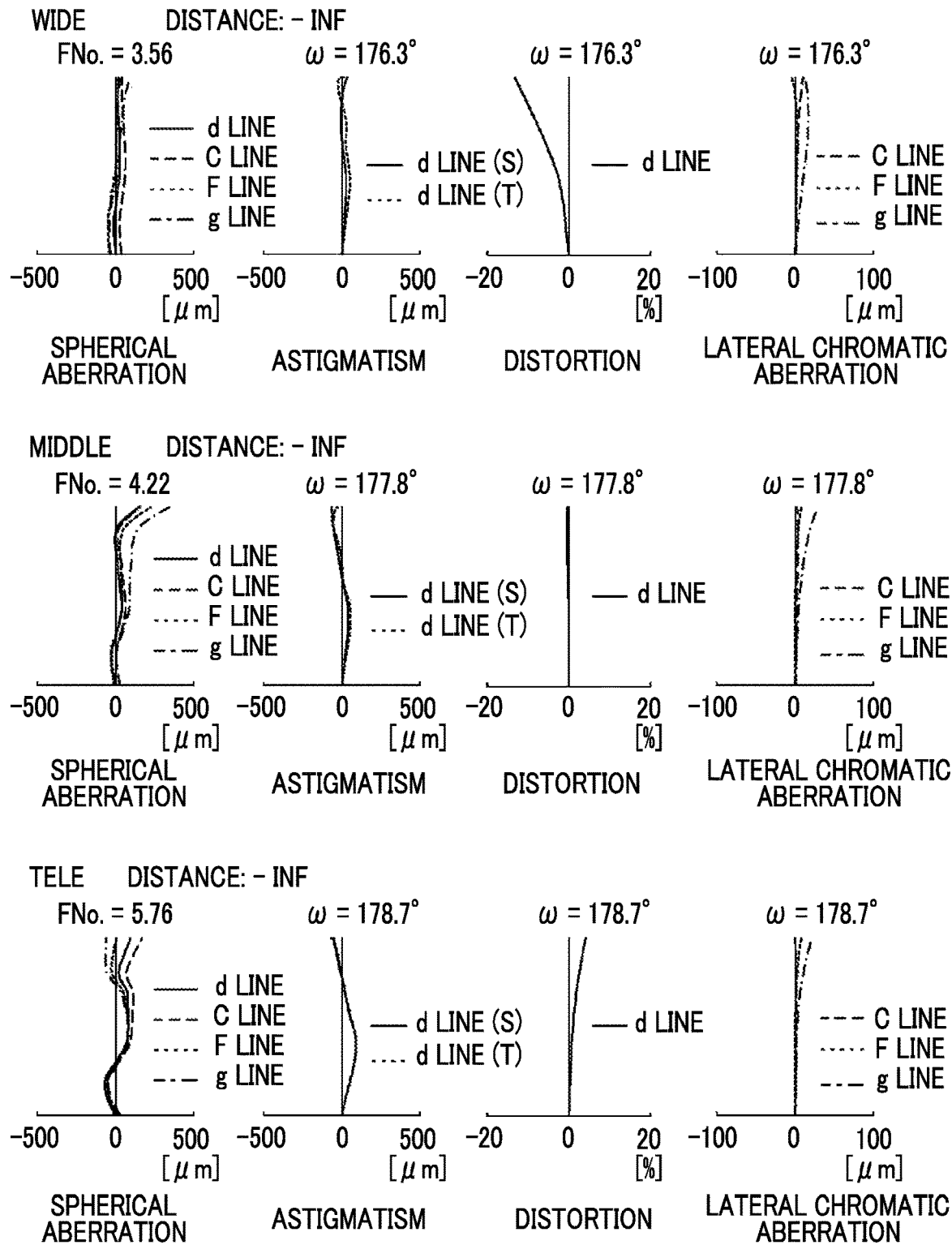
FIG. 6 is a diagram of aberrations of the zoom lens of Example 1 of the present invention during focusing on the object at infinity.
Figure 7:
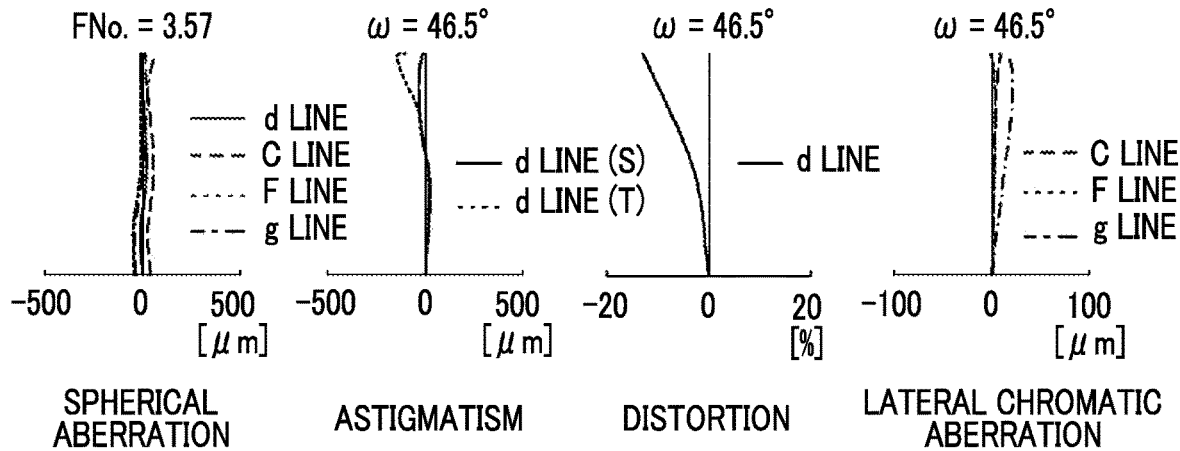
FIG. 7 is a diagram of aberrations of the zoom lens of Example 1 of the present invention during focusing on the object at a finite distance.
Figure 7:
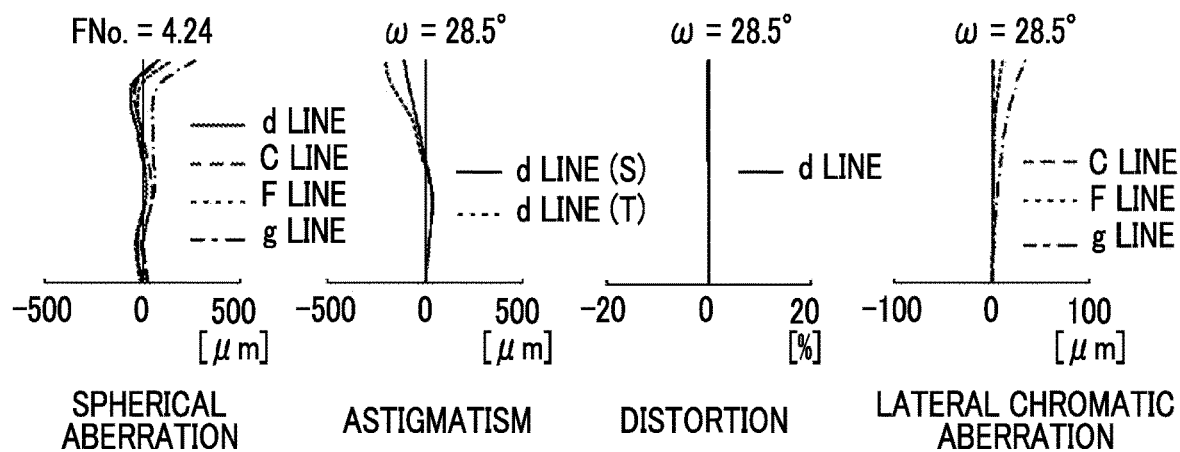
Figure 7:
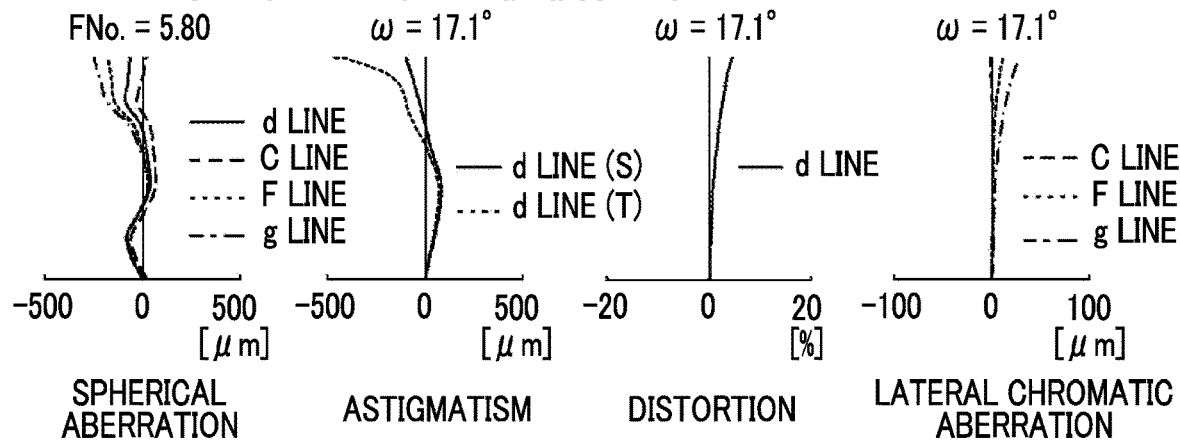

FIG. 6 shows aberration diagrams aberrations of the zoom lens of Example 1 during focusing on the object at infinity. FIG. 7 shows aberration diagrams of the zoom lens of Example 1 during focusing on the object at a finite distance (focusing on the object at a distance of 1 m from the image plane). In addition, spherical aberration, astigmatism, distortion, and lateral chromatic aberration at the wide-angle end (WIDE) are shown in order from the upper left side of FIG. 6 or 7, spherical aberration, astigmatism, distortion, and lateral chromatic aberration at the middle position (MID) are shown in order from the middle left side of FIG. 6 or 7, and spherical aberration, astigmatism, distortion, and lateral chromatic aberration at the telephoto end (TELE) are shown in order from the lower left side of FIG. 6 or 7. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C line (a wavelength of 656.3 nm (nanometers)), the F line (a wavelength of 486.1 nm (nanometers)), and the g line (a wavelength of 435.8 nm (nanometers)) are respectively indicated by the long dashed line, the short dashed line, and the gray solid line. In addition, in the spherical aberration diagram, FNo. means an F number. In the other aberration diagrams, ω means a half angle of view.

Figure 2:
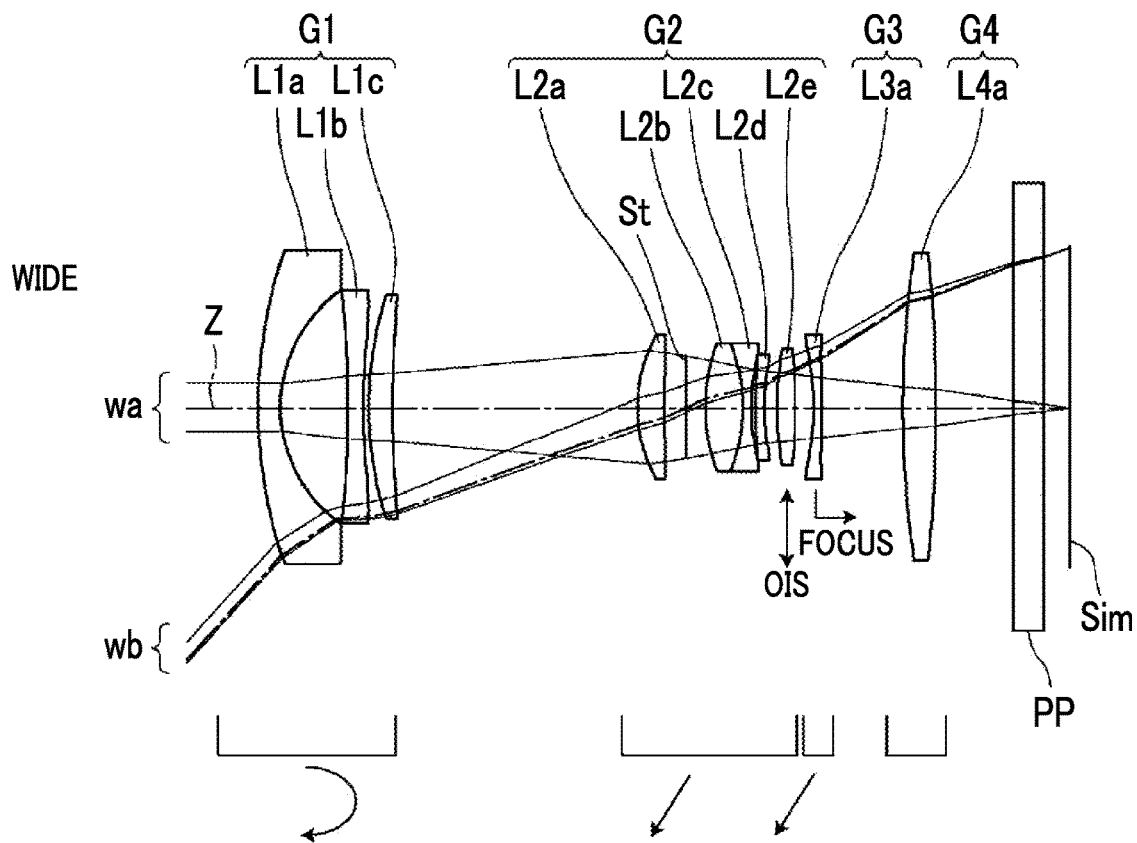
FIG. 2 is a cross-sectional view illustrating a lens configuration of a zoom lens of Example 2 of the present invention.
Figure 2:
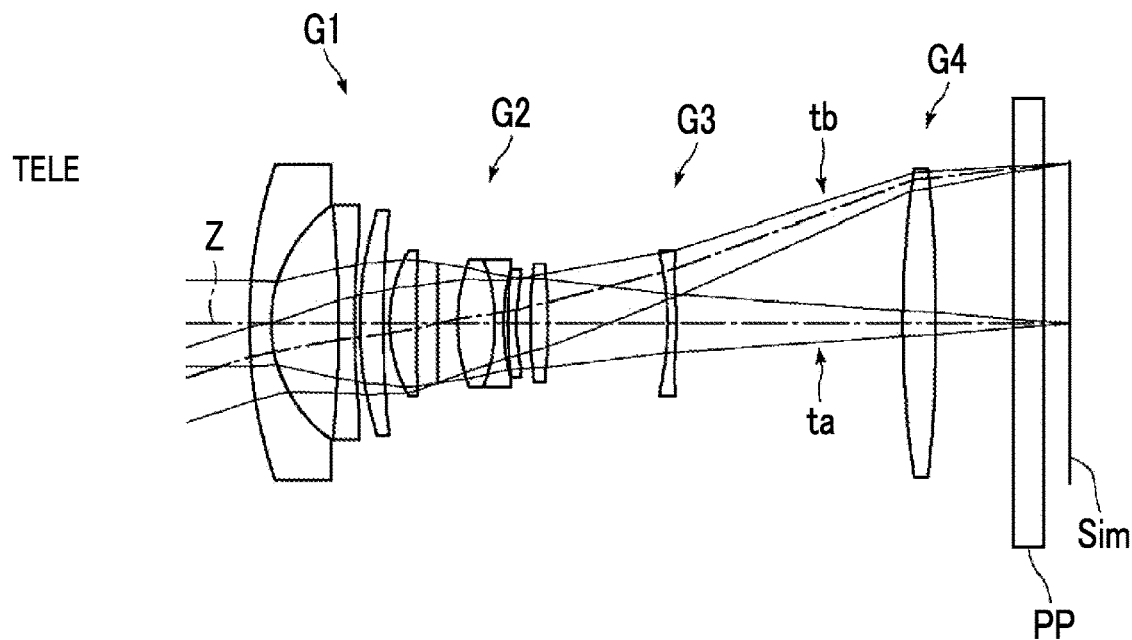
Figure 8:
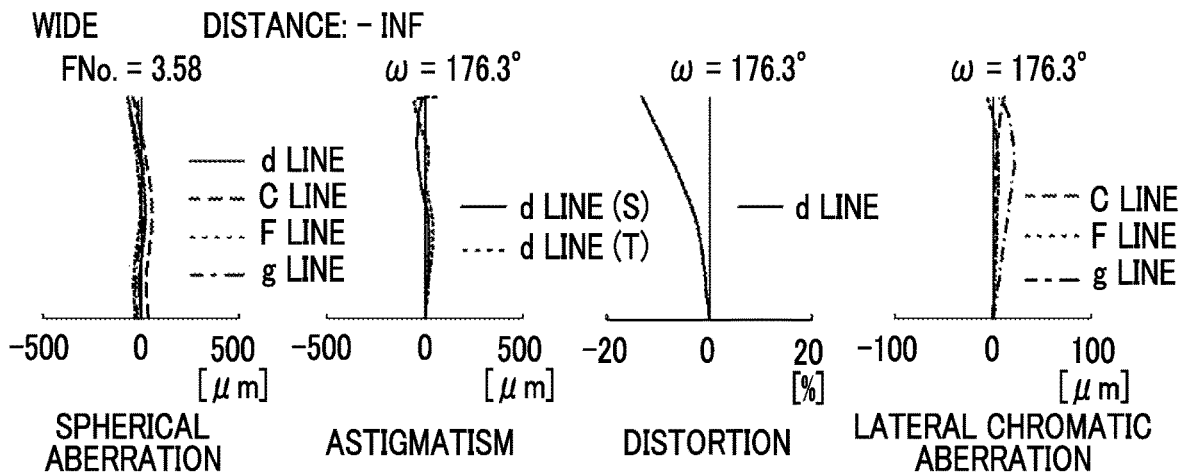
FIG. 8 is a diagram of aberrations of the zoom lens of Example 2 of the present invention during focusing on the object at infinity.
Figure 8:
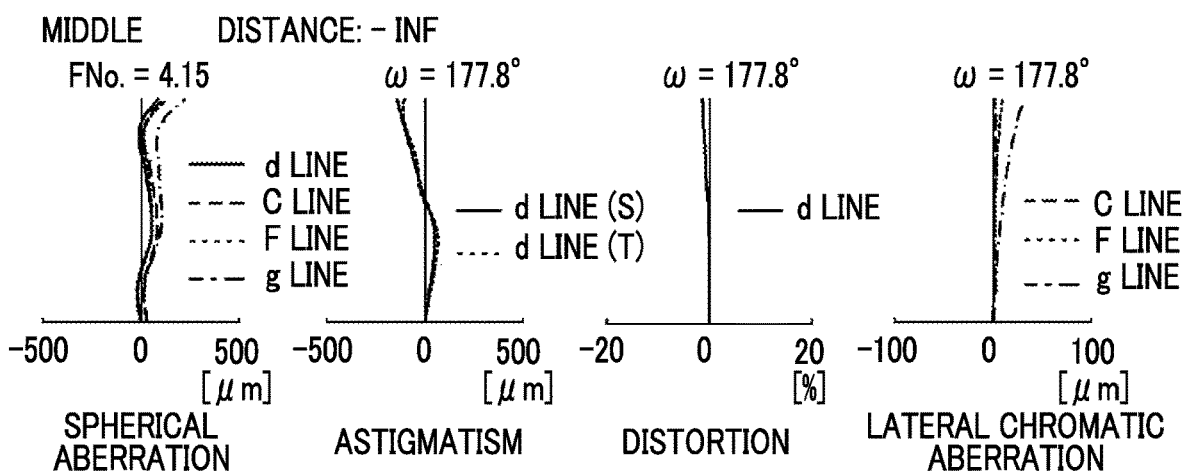
Figure 8:
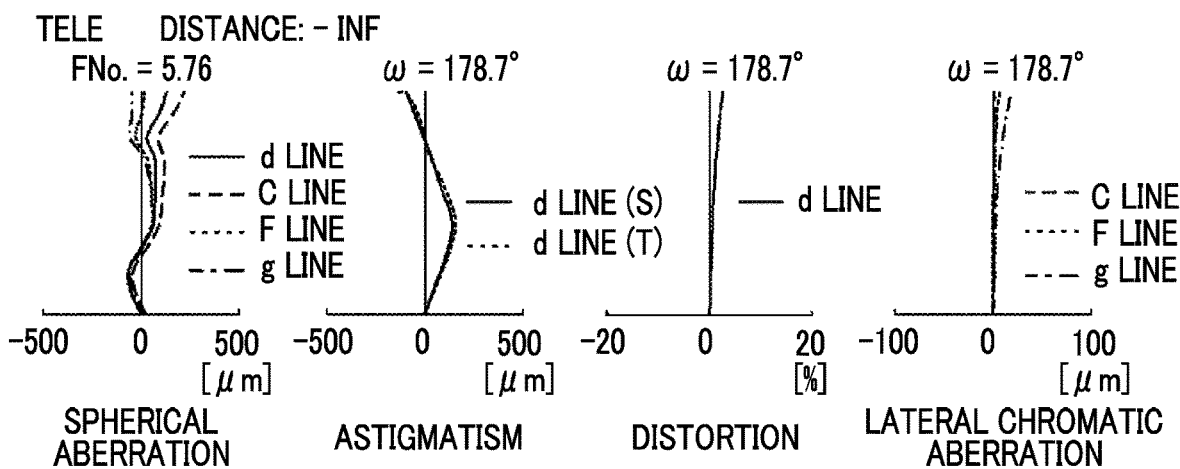
Figure 9:
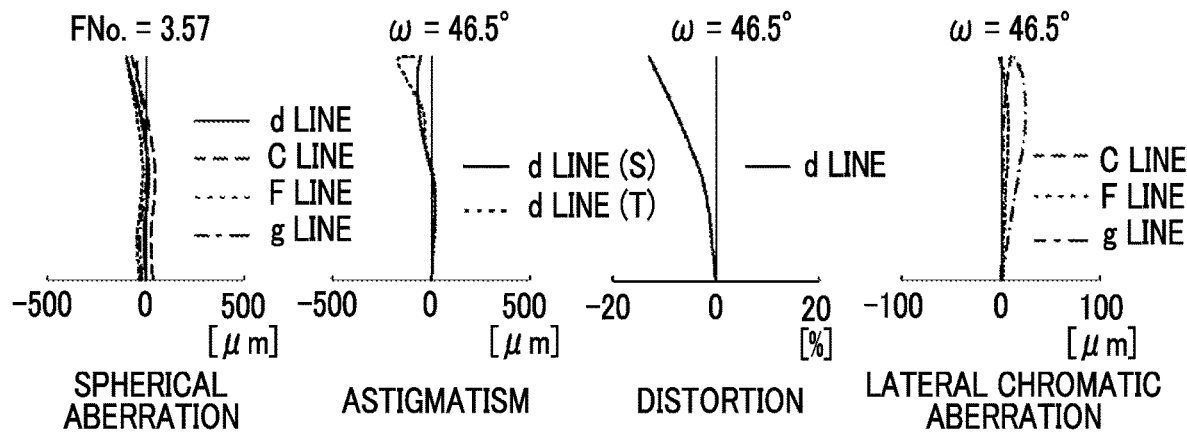
FIG. 9 is a diagram of aberrations of the zoom lens of Example 2 of the present invention during focusing on the object at a finite distance.
Figure 9:
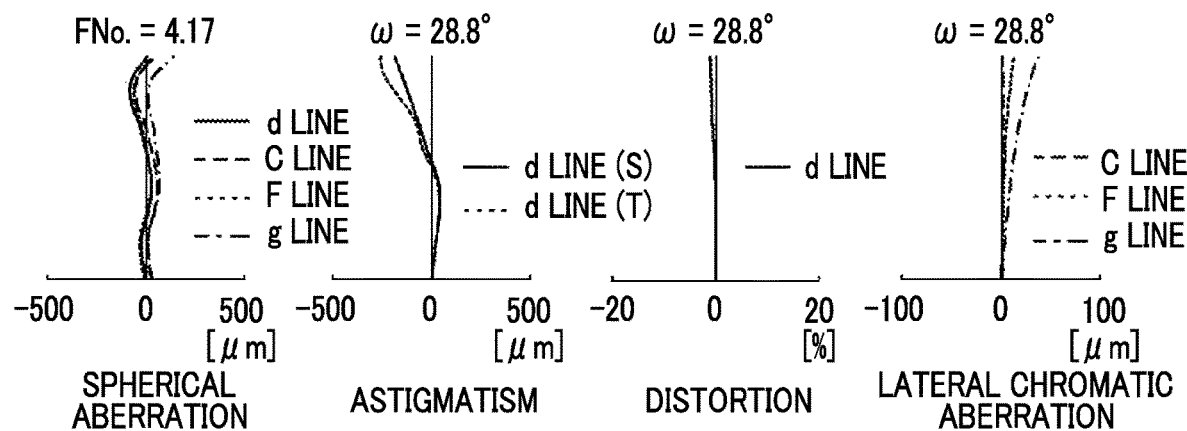
Figure 9:
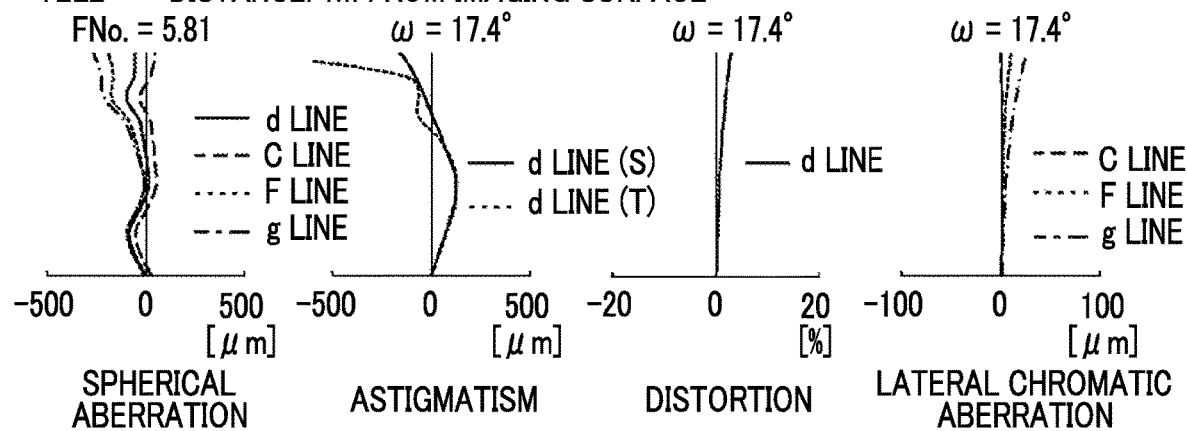

Next, a zoom lens of Example 2 will be described. FIG. 2 is a cross-sectional view illustrating a lens configuration of the zoom lens of Example 2. The group configuration of the zoom lens of Example 2 and the lens groups moving during zooming are the same as those of the zoom lens of Example 1. Table 5 shows basic lens data of the zoom lens of Example 2, Table 6 shows data about specification, Table 7 shows data about surface distances which are variable, Table 8 shows data about aspheric surface coefficients thereof, FIG. 8 shows aberration diagrams during focusing on the object at infinity, and FIG. 9 shows aberration diagrams during focusing on the object at a finite distance (focusing on the object at a distance of 1 m from the image plane).

TABLE 5

Example 2 Lens Data (n and ν are based on d line)

| Surface Number | Radius of Curvature | Surface Distance | n | ν |
|---|---|---|---|---|
| 1 | 41.857 | 2.03 | 1.91082 | 35.25 |
| 2 | 12.500 | 6.21 | | |
| *3 | −170.254 | 1.50 | 1.51633 | 64.06 |
| *4 | 52.263 | 0.50 | | |
| 5 | 31.484 | 2.21 | 1.94595 | 17.98 |
| 6 | 98.598 | DD[6] | | |
| 7 | 12.789 | 2.50 | 1.60311 | 60.64 |
| 8 | 279.980 | 2.00 | | |
| 9(Stop) | ∞ | 1.83 | | |
| 10 | 15.625 | 3.51 | 1.61800 | 63.33 |
| 11 | −14.666 | 0.75 | 1.67270 | 32.10 |
| 12 | 17.176 | 0.45 | | |
| *13 | 37.193 | 0.79 | 1.88202 | 37.22 |
| *14 | 18.961 | 1.25 | | |
| 15 | 34.873 | 1.62 | 1.51633 | 64.14 |
| 16 | −59.527 | DD[16] | | |
| *17 | −16.616 | 0.75 | 1.51633 | 64.06 |
| *18 | −38.930 | DD[18] | | |
| 19 | 89.842 | 3.12 | 1.89190 | 37.13 |
| 20 | −124.995 | 7.19 | | |
| 21 | ∞ | 2.85 | 1.51633 | 64.14 |
| 22 | ∞ | DD[22] | | |

TABLE 6

Example 2 Specification (d Line)

Focusing on Object at Infinity

| | WIDE | MID | TELE |
|---|---|---|---|
| Zoom Magnification | 1.0 | 1.7 | 2.8 |
| f' | 15.46 | 26.01 | 43.76 |
| Bf' | 11.48 | 11.48 | 11.48 |
| FNo. | 3.56 | 4.15 | 5.76 |
| 2ω[°] | 93.2 | 58.0 | 35.0 |

Focusing on Object at Finite Distance

| | WIDE | MID | TELE |
|---|---|---|---|
| Zoom Magnification | 1.0 | 1.7 | 2.8 |
| f' | 15.40 | 25.84 | 43.27 |
| Bf' | | | |
| FNo. | 3.57 | 4.17 | 5.81 |
| 2ω[°] | 93.0 | 57.6 | 34.8 |

TABLE 7

Example 2 Moved Surface Distance

Focusing on Object at Infinity

| | WIDE | MID | TELE |
|---|---|---|---|
| DD[6] | 22.71 | 9.54 | 0.60 |
| DD[16] | 1.75 | 4.05 | 11.11 |
| DD[18] | 7.49 | 15.09 | 21.08 |
| DD[22] | 2.41 | 2.41 | 2.41 |

Focusing on Object at Finite Distance

| | WIDE | MID | TELE |
|---|---|---|---|
| DD[6] | 22.71 | 9.54 | 0.60 |
| DD[16] | 2.14 | 4.86 | 13.00 |
| DD[18] | 7.10 | 14.28 | 19.19 |
| DD[22] | 2.41 | 2.41 | 2.41 |

TABLE 8

Example 2 Aspheric surface coefficient

| Surface Number | 3 | 4 | 13 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 2.3102402E−05 | −1.9872664E−05 | 4.4258136E−05 |
| A5 | −3.0605318E−05 | −1.5575712E−05 | −2.1804482E−04 |
| A6 | 7.5843999E−06 | 2.8877488E−06 | 4.8891699E−05 |
| A7 | −7.4650433E−07 | −1.9432425E−08 | 4.1088326E−06 |
| A8 | 4.5517244E−09 | −3.7588737E−08 | −2.6397640E−06 |
| A9 | 3.0198780E−09 | 4.8989472E−10 | 1.1276074E−07 |
| A10 | 6.4361175E−11 | 3.1874744E−10 | 2.8066116E−08 |
| A11 | −6.1999295E−12 | 1.1436966E−11 | 8.2174220E−09 |
| A12 | −2.4847556E−12 | −1.9563157E−12 | −4.2633115E−10 |

TABLE 8-continued

Example 2 Aspheric surface coefficient

| Surface Number | 3 | 4 | 13 |
|---|---|---|---|
| A13 | 7.9141628E-14 | -1.9124501E-13 | 2.1648624E-10 |
| A14 | 8.7287405E-15 | 9.4384614E-18 | -1.4118345E-10 |
| A15 | 5.9237115E-16 | 8.9693400E-16 | -4.2814363E-11 |
| A16 | -7.1495434E-17 | 9.8425587E-17 | 3.5861675E-12 |
| A17 | -1.2834068E-18 | 5.5344444E-18 | 1.0882290E-12 |
| A18 | 3.5072366E-20 | -6.3006156E-19 | 3.5904977E-13 |
| A19 | 2.5933437E-21 | -1.3047190E-19 | 1.1031178E-14 |
| A20 | 3.3001880E-22 | 8.4934016E-21 | -1.4829709E-14 |

| Surface Number | 14 | 17 | 18 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 1.0944202E-04 | 6.4736442E-04 | 8.5492381E-04 |
| A5 | -1.2878047E-04 | -1.8223142E-05 | -1.8615203E-04 |
| A6 | 2.4956726E-05 | -3.4670275E-05 | 1.8120470E-05 |
| A7 | -5.6244517E-06 | 5.2443248E-06 | 1.9097969E-07 |
| A8 | 2.3172252E-06 | 7.5375711E-07 | 2.1447225E-08 |
| A9 | 1.2812149E-07 | -5.5776127E-08 | -1.7277950E-09 |
| A10 | -6.6704772E-08 | -2.8409393E-08 | 1.7554165E-09 |
| A11 | -2.4807429E-08 | -4.6872033E-10 | -1.6619831E-09 |
| A12 | -5.4431427E-11 | 3.7188422E-10 | -1.7204532E-10 |
| A13 | 4.4891893E-10 | 1.0993389E-12 | 1.6563486E-11 |
| A14 | 2.8921689E-10 | 7.3895099E-12 | 9.7918978E-12 |
| A15 | 1.0335906E-11 | -4.5018064E-13 | 1.5370010E-12 |
| A16 | -6.4045677E-12 | 2.8069880E-13 | -2.8438703E-13 |
| A17 | -3.4791030E-12 | -4.9341085E-14 | -3.3897996E-14 |
| A18 | 1.8259527E-13 | -2.3889181E-15 | -1.4774817E-15 |
| A19 | 1.7713453E-13 | -6.0215416E-16 | 1.2373185E-15 |
| A20 | -2.0982766E-14 | 1.3744628E-16 | -6.7198913E-17 |

Figure 3:
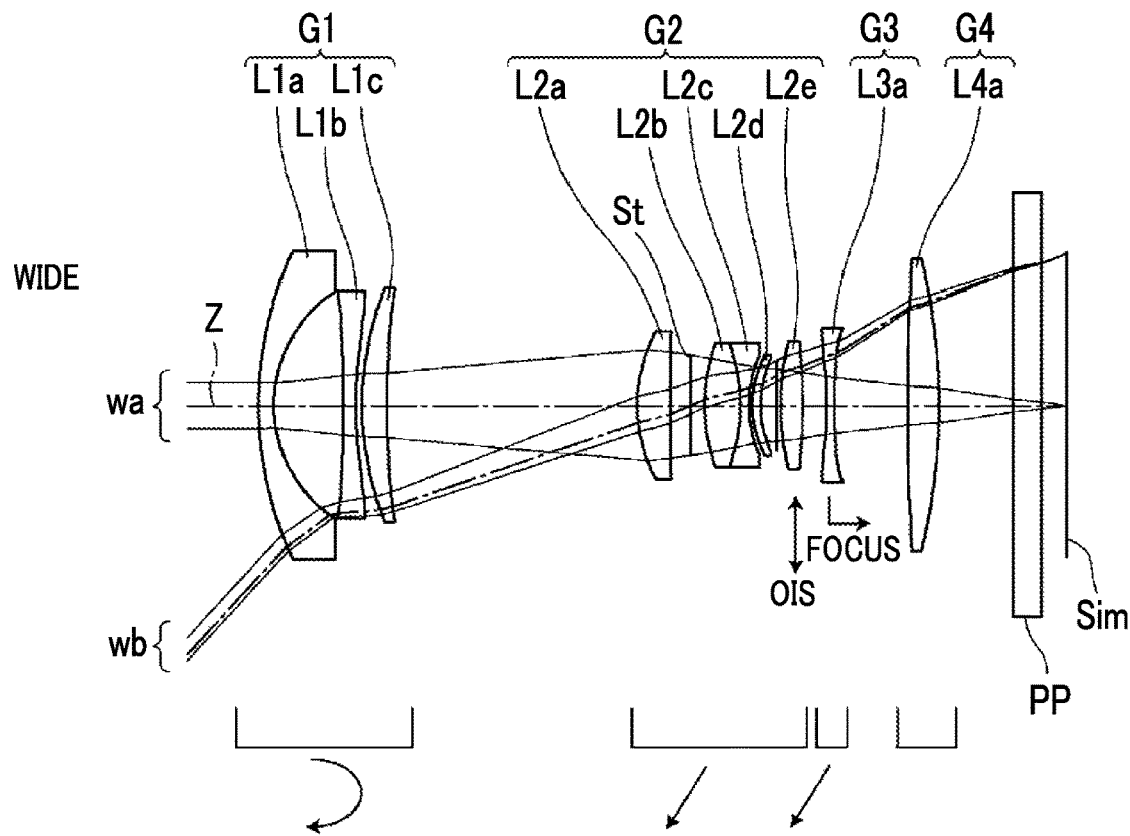
FIG. 3 is a cross-sectional view illustrating a lens configuration of a zoom lens of Example 3 of the present invention.
Figure 3:
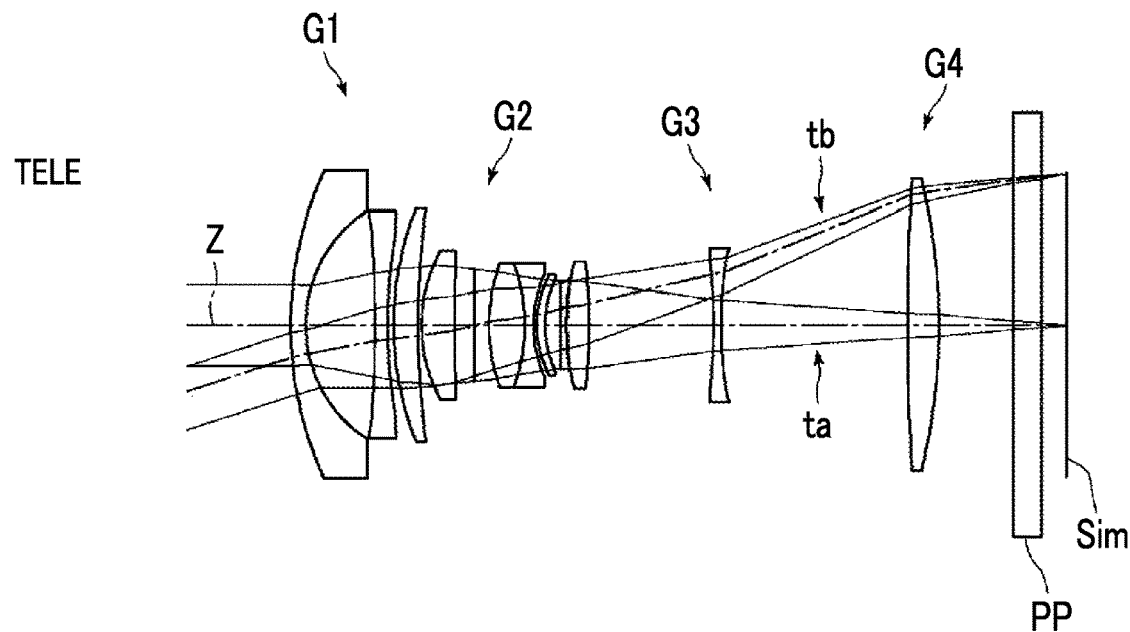
Figure 10:
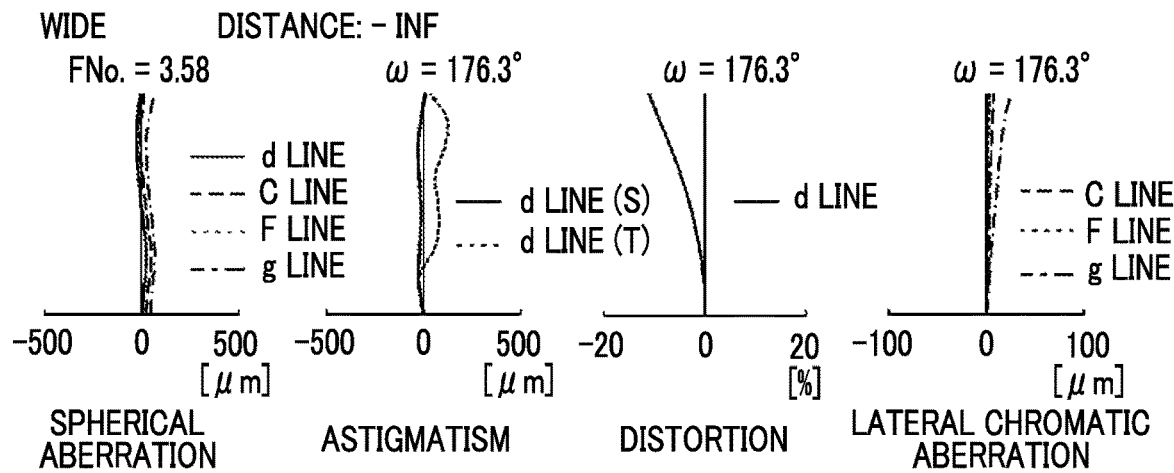
FIG. 10 is a diagram of aberrations of the zoom lens of Example 3 of the present invention during focusing on the object at infinity.
Figure 10:
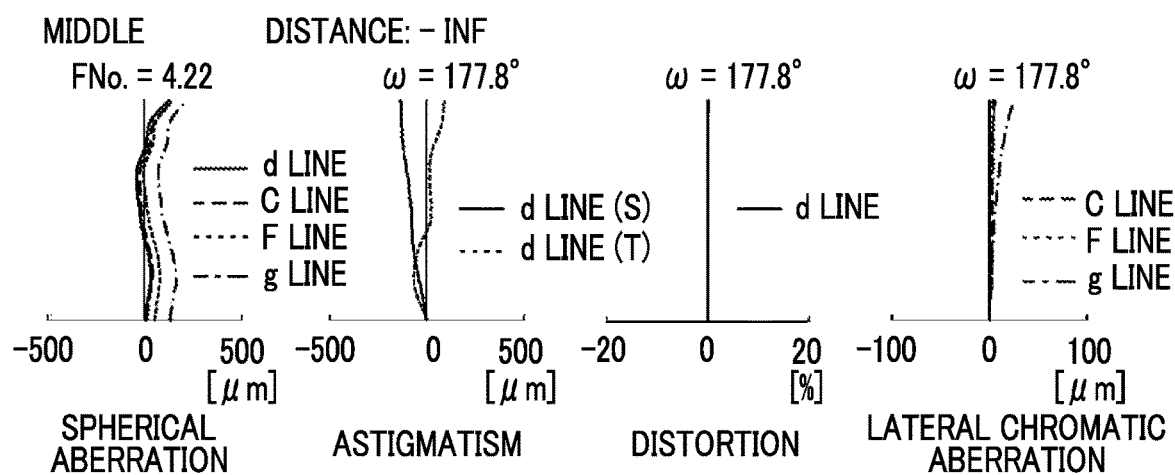
Figure 10:
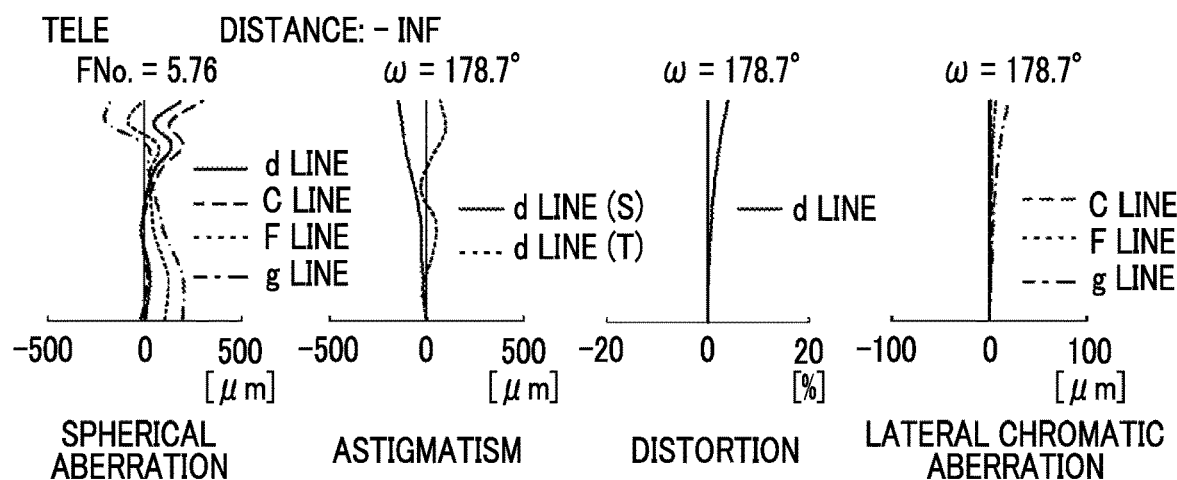
Figure 11:
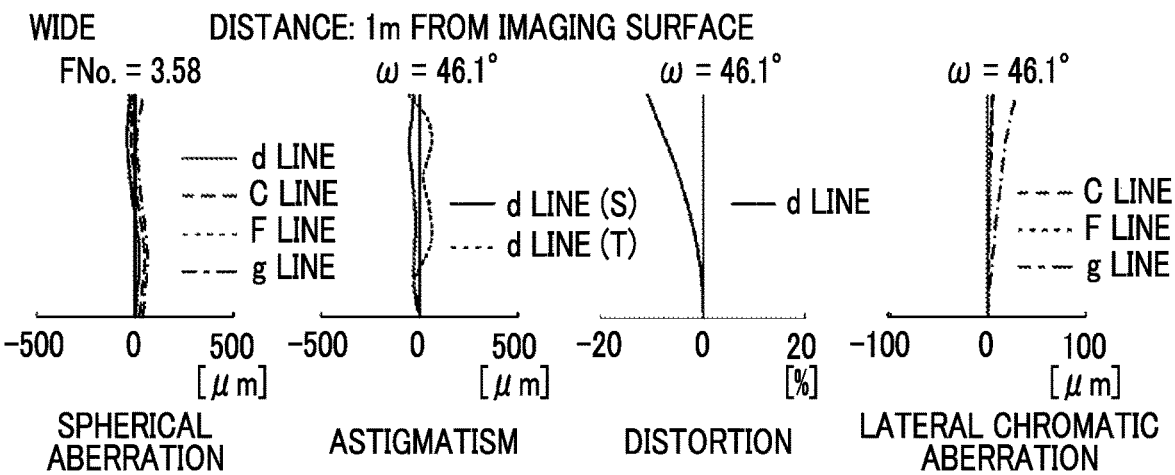
FIG. 11 is a diagram of aberrations of the zoom lens of Example 3 of the present invention during focusing on the object at a finite distance.
Figure 11:
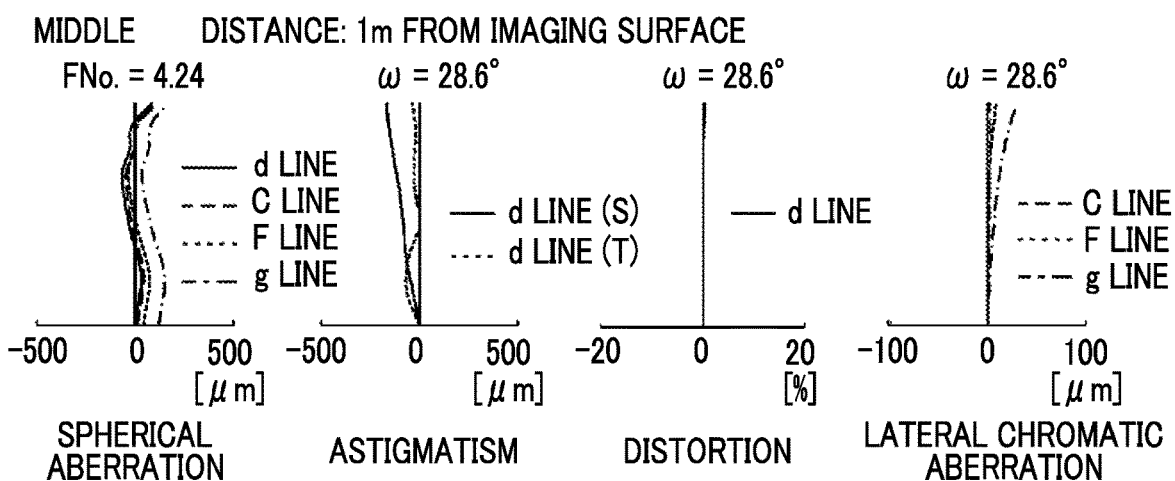
Figure 11:
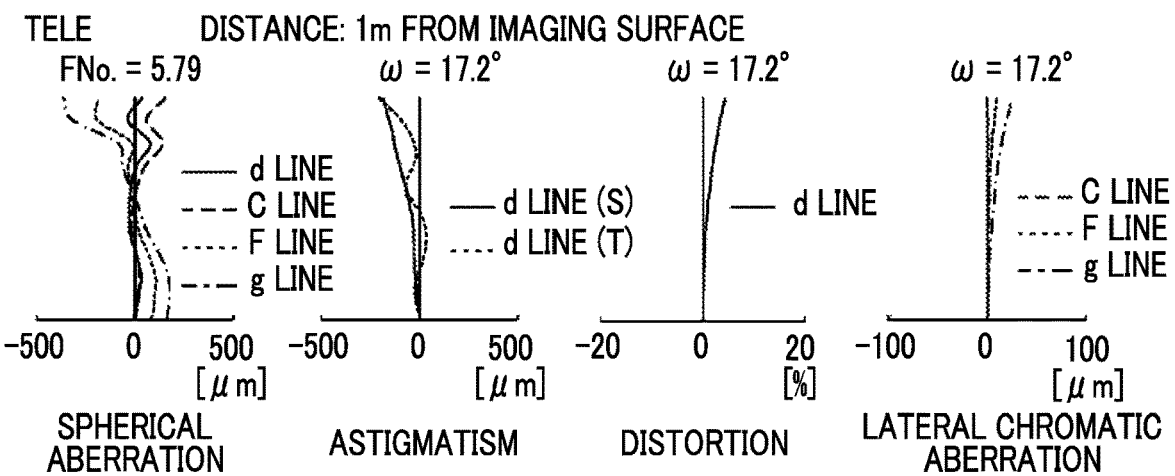

Next, a zoom lens of Example 3 will be described. FIG. 3 is a cross-sectional view illustrating a lens configuration of the zoom lens of Example 3. The group configuration of the zoom lens of Example 3 and the lens groups moving during zooming are the same as those of the zoom lens of Example 1. Table 9 shows basic lens data of the zoom lens of Example 3, Table 10 shows data about specification, Table 11 shows data about surface distances which are variable, Table 12 shows data about aspheric surface coefficients thereof, FIG. 10 shows aberration diagrams during focusing on the object at infinity, and FIG. 11 shows aberration diagrams during focusing on the object at a finite distance (focusing on the object at a distance of 1 m from the image plane).

TABLE 9

Example 3 Lens Data (n and ν are based on d line)

| Surface Number | Radius of Curvature | Surface Distance | n | ν |
|---|---|---|---|---|
| 1 | 33.295 | 1.50 | 1.95375 | 32.32 |
| 2 | 12.545 | 6.80 | | |
| *3 | -166.671 | 1.25 | 1.53409 | 55.89 |
| *4 | 37.868 | 0.62 | | |
| 5 | 28.348 | 2.42 | 1.94595 | 17.98 |
| 6 | 77.488 | DD[6] | | |
| 7 | 14.050 | 3.25 | 1.62041 | 60.29 |
| 8 | 220.173 | 2.00 | | |
| 9(Stop) | ∞ | 1.41 | | |
| 10 | 16.454 | 3.51 | 1.53775 | 74.70 |
| 11 | -16.454 | 0.88 | 1.62588 | 35.70 |
| 12 | 11.479 | 0.29 | | |
| *13 | 8.654 | 0.85 | 1.58313 | 59.38 |
| *14 | 9.675 | 2.00 | | |

TABLE 9-continued

Example 3 Lens Data (n and ν are based on d line)

| Surface Number | Radius of Curvature | Surface Distance | n | ν |
|---|---|---|---|---|
| 15 | 25.665 | 2.14 | 1.49700 | 81.61 |
| 16 | -54.915 | DD[16] | | |
| *17 | -23.396 | 0.75 | 1.58313 | 59.38 |
| *18 | 538.989 | DD[18] | | |
| 19 | 199.780 | 3.13 | 1.80400 | 46.53 |
| 20 | -55.566 | 7.33 | | |
| 21 | ∞ | 2.85 | 1.51633 | 64.14 |
| 22 | ∞ | DD[22] | | |

TABLE 10

Example 3 Specification (d Line)

Focusing on Object at Infinity

| | WIDE | MID | TELE |
|---|---|---|---|
| Zoom Magnification | 1.0 | 1.7 | 2.9 |
| f' | 15.33 | 25.78 | 43.72 |
| Bf' | 11.62 | 11.62 | 11.62 |
| FNo. | 3.58 | 4.22 | 5.76 |
| 2ω[°] | 92.4 | 57.6 | 34.6 |

Focusing on Object at Finite Distance

| | WIDE | MID | TELE |
|---|---|---|---|
| Zoom Magnification | 1.0 | 1.7 | 2.9 |
| f' | 15.25 | 25.57 | 43.04 |
| Bf' | | | |
| FNo. | 3.58 | 4.24 | 5.79 |
| 2ω[°] | 92.2 | 57.2 | 34.4 |

TABLE 11

Example 3 Moved Surface Distance

Focusing on Object at Infinity

| | WIDE | MID | TELE |
|---|---|---|---|
| DD[6] | 24.57 | 10.26 | 0.34 |
| DD[16] | 2.38 | 5.33 | 12.39 |
| DD[18] | 7.13 | 13.30 | 18.25 |
| DD[22] | 2.41 | 2.41 | 2.41 |

Focusing on Object at Finite Distance

| | WIDE | MID | TELE |
|---|---|---|---|
| DD[6] | 24.57 | 10.26 | 0.34 |
| DD[16] | 2.63 | 5.87 | 13.68 |
| DD[18] | 6.88 | 12.76 | 16.96 |
| DD[22] | 2.41 | 2.41 | 2.41 |

TABLE 12

Example 3 Aspheric surface coefficient

| Surface Number | 3 | 4 | 13 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | -1.9140163E-05 | -8.9669372E-05 | -5.7885505E-05 |
| A5 | -2.0582766E-05 | 1.2120440E-05 | -4.5028218E-05 |
| A6 | 8.7532733E-06 | -1.2563822E-07 | 3.0080467E-05 |
| A7 | -1.2534038E-06 | -6.0303929E-08 | -5.6206804E-06 |

TABLE 12-continued

Example 3 Aspheric surface coefficient

| Surface Number | 3 | 4 | 13 |
|---|---|---|---|
| A8 | 4.0773420E−08 | −2.5960056E−08 | −3.4363745E−06 |
| A9 | 4.0704728E−09 | 2.0308435E−09 | 6.7064995E−07 |
| A10 | −9.4877383E−13 | 3.0865462E−10 | 1.2992400E−07 |
| A11 | −1.3786661E−11 | 2.5785525E−12 | 5.4385873E−09 |
| A12 | −2.3438579E−12 | −2.7120098E−12 | −8.1095113E−09 |
| A13 | 7.0378998E−14 | −2.3213883E−13 | −1.0069337E−09 |
| A14 | 4.7956714E−15 | 5.5221688E−16 | −1.5186113E−10 |
| A15 | 6.5570093E−16 | 1.5262265E−15 | 2.7601121E−11 |
| A16 | −6.1312681E−17 | 1.3658555E−16 | 1.8124262E−11 |
| A17 | −3.1119018E−19 | 6.8029137E−18 | 6.8738032E−12 |
| A18 | 4.4360739E−19 | −7.0655118E−19 | −1.1634526E−12 |
| A19 | 8.8956009E−21 | −1.5783086E−19 | −3.5841100E−13 |
| A20 | −2.7150711E−21 | 8.6449700E−21 | 5.1481080E−14 |

| Surface Number | 14 | 17 | 18 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 2.4485462E−04 | 8.7676592E−04 | 8.4593296E−04 |
| A5 | −1.4110635E−04 | −1.2912489E−04 | −1.0174404E−04 |
| A6 | 5.6570853E−05 | −1.1057738E−05 | −1.0893908E−05 |
| A7 | −1.2286182E−05 | 3.5517914E−06 | 1.6115318E−06 |
| A8 | 3.1442298E−07 | 3.9148966E−07 | 3.6642342E−07 |
| A9 | 4.9931822E−08 | −5.1672445E−08 | −6.6077822E−09 |
| A10 | −2.6354143E−08 | −2.3030362E−08 | 1.3845027E−09 |
| A11 | −4.8123943E−09 | 8.0622832E−10 | −2.6787740E−09 |
| A12 | 4.7006529E−09 | 4.6251920E−10 | −2.5830497E−10 |
| A13 | 7.8000672E−10 | −1.0569499E−11 | 2.4784233E−11 |
| A14 | 2.4725126E−10 | 4.2888450E−12 | 1.4336896E−11 |
| A15 | −1.1394066E−10 | −1.9088366E−12 | 2.0857507E−12 |
| A16 | −3.3900876E−11 | 3.0620564E−13 | −3.4550528E−13 |
| A17 | −3.6498853E−12 | −3.4565295E−14 | −5.5890953E−14 |
| A18 | 2.0945668E−12 | 3.2062861E−15 | −2.8207885E−15 |
| A19 | 7.3243178E−13 | −8.4800996E−16 | 2.0201792E−15 |
| A20 | −1.4616295E−13 | 8.6893598E−17 | −1.1386512E−16 |

Figure 4:
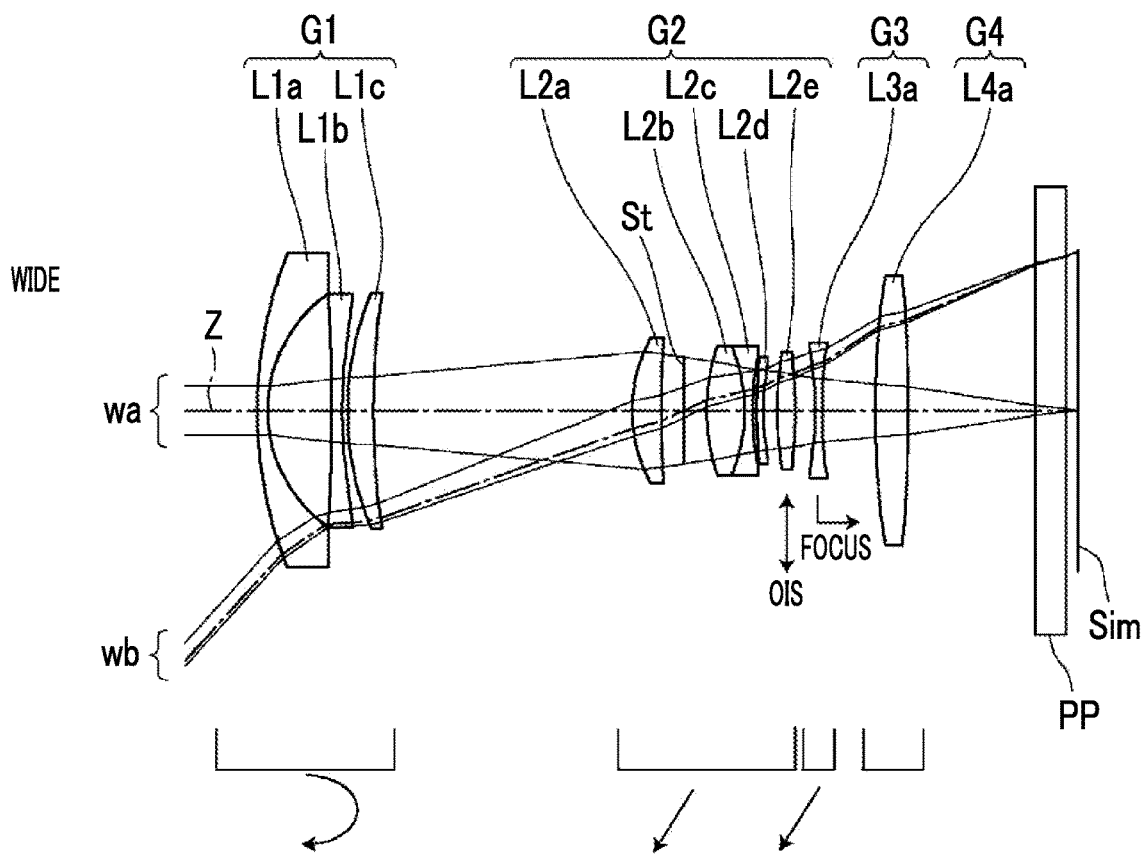
FIG. 4 is a cross-sectional view illustrating a lens configuration of a zoom lens of Example 4 of the present invention.
Figure 4:
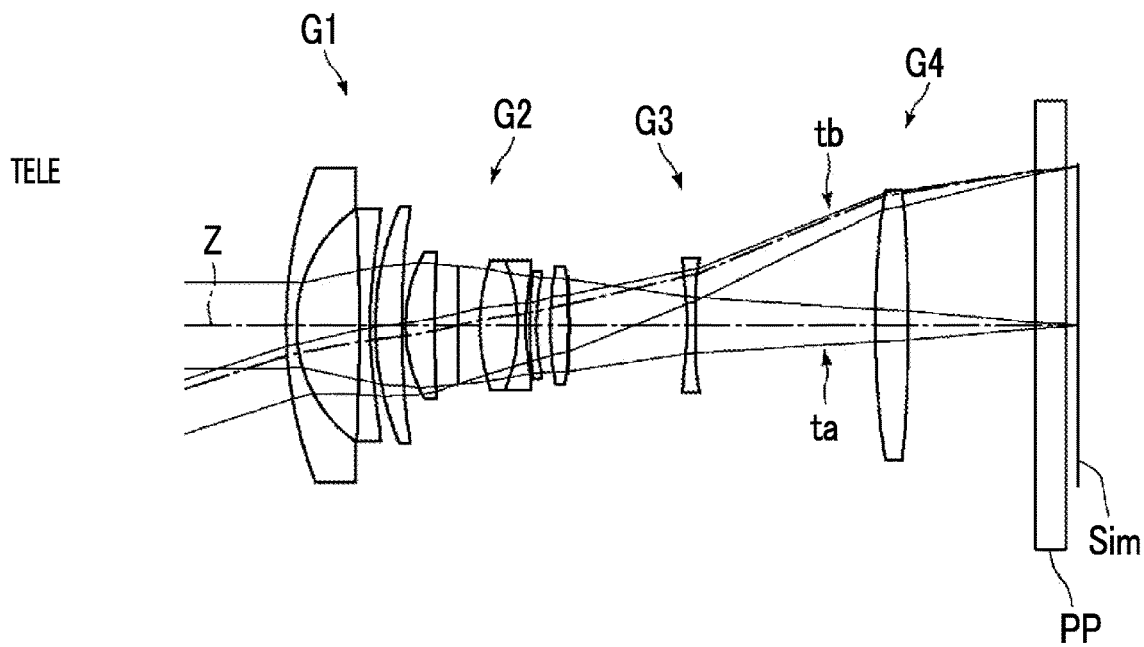
Figure 12:
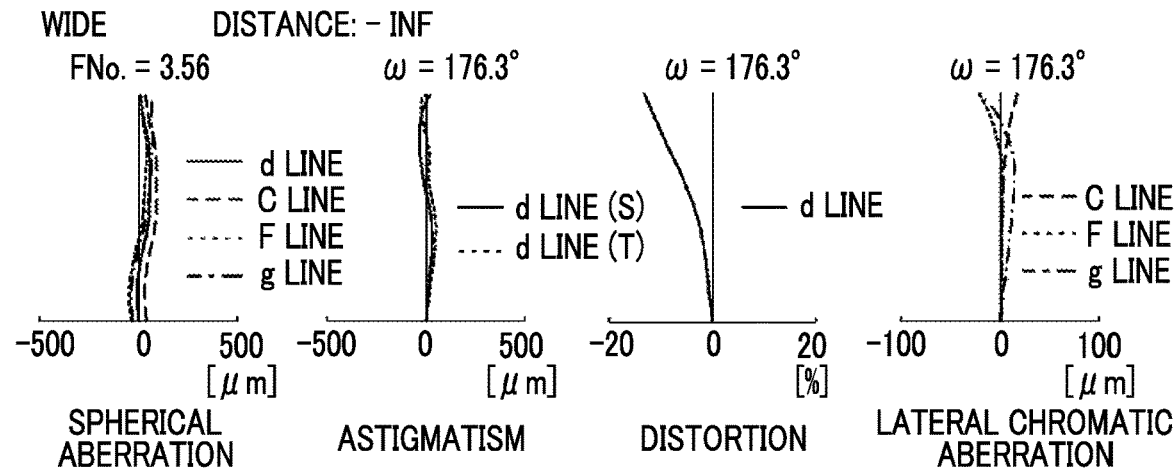
FIG. 12 is a diagram of aberrations of the zoom lens of Example 4 of the present invention during focusing on the object at infinity.
Figure 12:
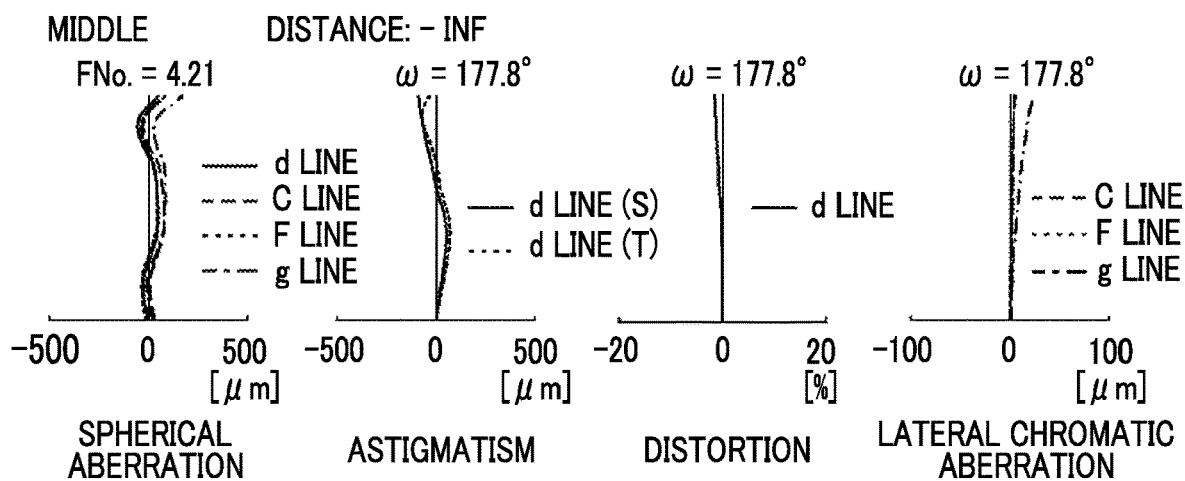
Figure 12:
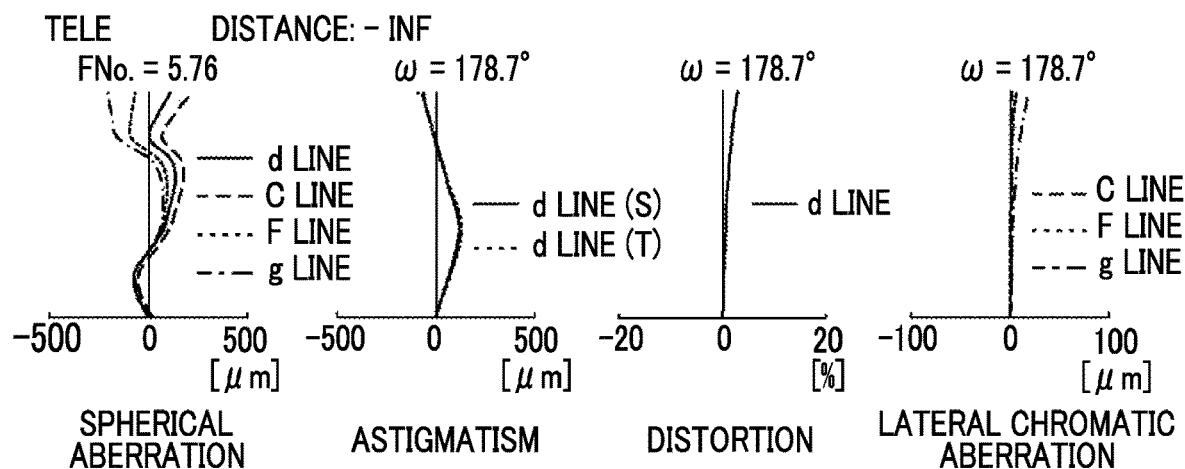
Figure 13:
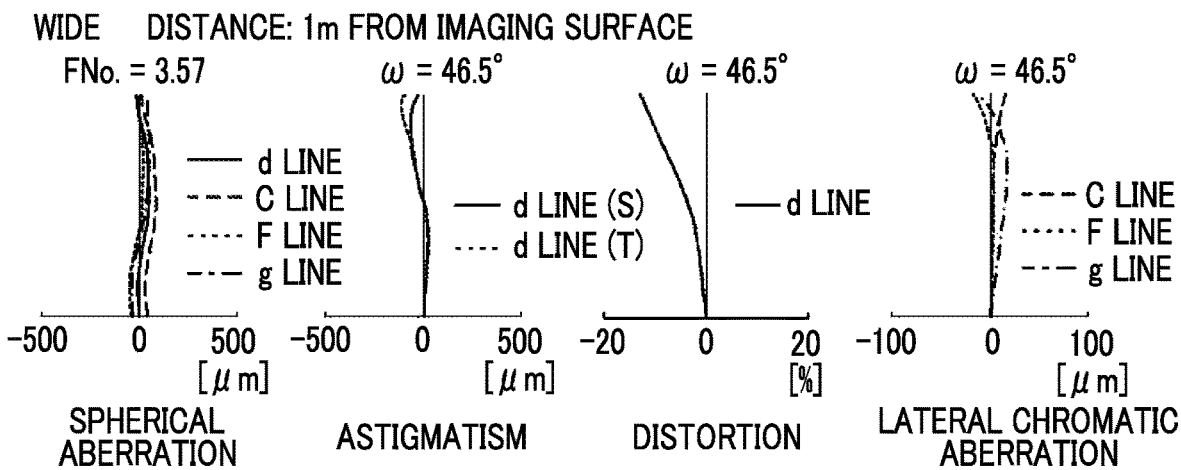
FIG. 13 is a diagram of aberrations of the zoom lens of Example 4 of the present invention during focusing on the object at a finite distance.
Figure 13:
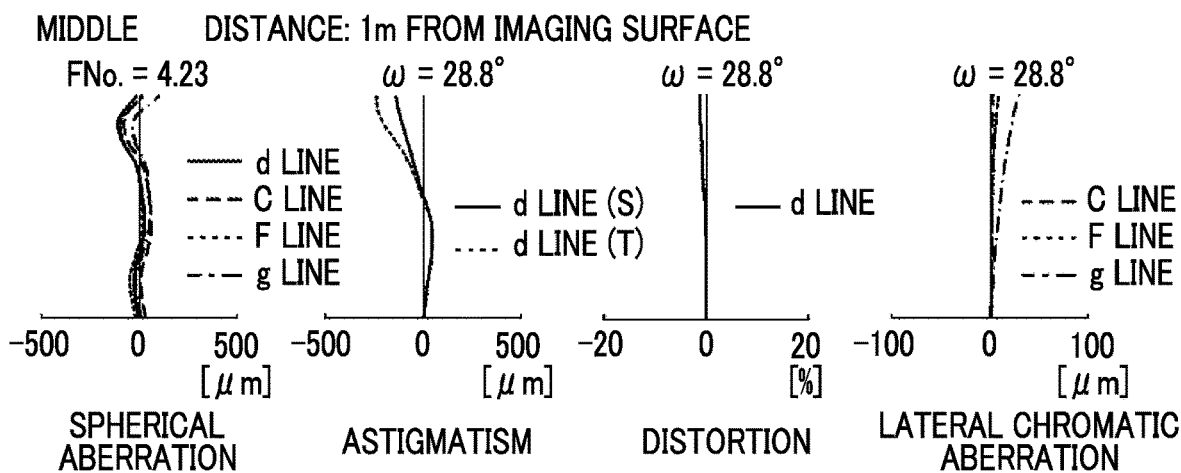
Figure 13:
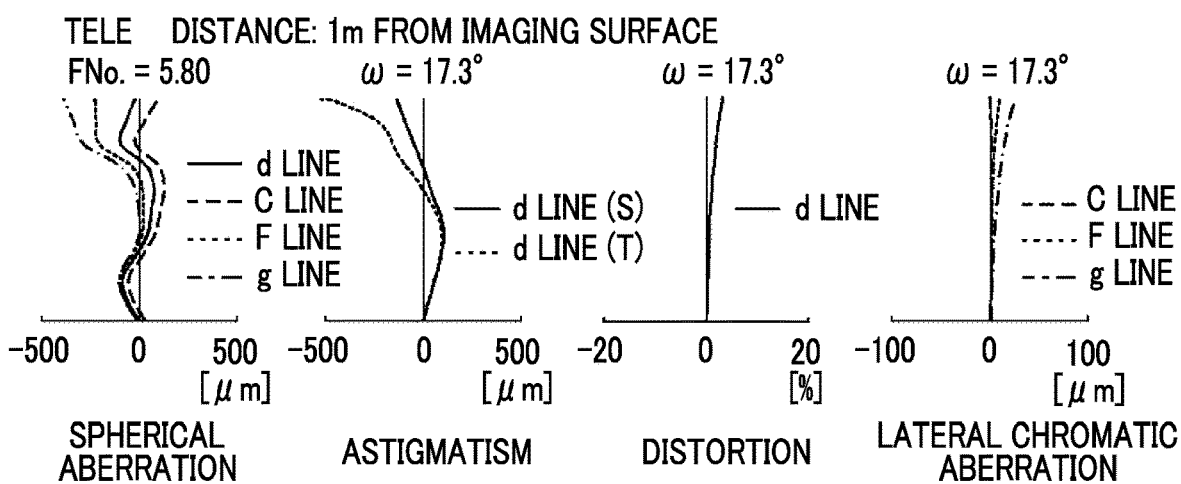

Next, a zoom lens of Example 4 will be described. FIG. 4 is a cross-sectional view illustrating a lens configuration of the zoom lens of Example 4. The group configuration of the zoom lens of Example 4 and the lens groups moving during zooming are the same as those of the zoom lens of Example 1. Table 13 shows basic lens data of the zoom lens of Example 4, Table 14 shows data about specification, Table 15 shows data about surface distances which are variable, Table 16 shows data about aspheric surface coefficients thereof, FIG. 12 shows aberration diagrams during focusing on the object at infinity, and FIG. 13 shows aberration diagrams during focusing on the object at a finite distance (focusing on the object at a distance of 1 m from the image plane).

TABLE 13

Example 4 Lens Data (n and ν are based on d line)

| Surface Number | Radius of Curvature | Surface Distance | n | ν |
|---|---|---|---|---|
| 1 | 37.234 | 0.95 | 1.95375 | 32.32 |
| 2 | 12.500 | 5.92 | | |
| *3 | −284.651 | 1.00 | 1.53409 | 55.89 |
| *4 | 39.025 | 0.50 | | |
| 5 | 26.405 | 2.40 | 1.94595 | 17.98 |
| 6 | 71.780 | DD[6] | | |
| 7 | 12.931 | 2.76 | 1.60311 | 60.64 |
| 8 | 95.540 | 2.13 | | |
| 9(Stop) | ∞ | 2.13 | | |
| 10 | 16.604 | 3.51 | 1.61800 | 63.33 |
| 11 | −14.619 | 0.69 | 1.67270 | 32.10 |
| 12 | 22.534 | 0.40 | | |
| *13 | 36.231 | 0.62 | 1.88202 | 37.22 |
| *14 | 20.711 | 1.25 | | |
| 15 | 29.737 | 1.62 | 1.51633 | 64.14 |
| 16 | −52.105 | DD[16] | | |
| *17 | −21.414 | 0.69 | 1.58313 | 59.38 |
| *18 | 162.838 | DD[18] | | |
| 19 | 71.162 | 3.12 | 1.83481 | 42.74 |
| 20 | −124.995 | 11.69 | | |
| 21 | ∞ | 2.85 | 1.51633 | 64.14 |
| 22 | ∞ | DD[22] | | |

TABLE 14

Example 4 Specification (d Line)

Focusing on Object at Infinity

| | WIDE | MID | TELE |
|---|---|---|---|
| Zoom Magnification | 1.0 | 1.7 | 2.8 |
| f' | 15.47 | 26.02 | 43.78 |
| Bf' | 14.70 | 14.70 | 14.70 |
| FNo. | 3.56 | 4.21 | 5.76 |
| 2ω[°] | 93.2 | 58.0 | 35.0 |

Focusing on Object at Finite Distance

| | WIDE | MID | TELE |
|---|---|---|---|
| Zoom Magnification | 1.0 | 1.7 | 2.8 |
| f' | 15.39 | 25.76 | 42.98 |
| Bf' | | | |
| FNo. | 3.57 | 4.23 | 5.80 |
| 2ω[°] | 93.0 | 57.6 | 34.6 |

TABLE 15

Example 4 Moved Surface Distance

Focusing on Object at Infinity

| | WIDE | MID | TELE |
|---|---|---|---|
| DD[6] | 23.87 | 9.70 | 0.39 |
| DD[16] | 1.83 | 4.99 | 10.95 |
| DD[18] | 4.84 | 10.71 | 16.87 |
| DD[22] | 1.13 | 1.13 | 1.13 |

Focusing on Object at Finite Distance

| | WIDE | MID | TELE |
|---|---|---|---|
| DD[6] | 23.87 | 9.70 | 0.39 |
| DD[16] | 2.04 | 5.45 | 11.98 |
| DD[18] | 4.63 | 10.26 | 15.83 |
| DD[22] | 1.13 | 1.13 | 1.13 |

TABLE 16

Example 4 Aspheric surface coefficient

| Surface Number | 3 | 4 | 13 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 7.2543638E−06 | −2.6792194E−05 | 1.0153410E−04 |
| A5 | −2.6740525E−05 | −1.3809102E−05 | −2.1614739E−04 |
| A6 | 7.4822053E−06 | 3.0144481E−06 | 4.7805353E−05 |
| A7 | −7.4665485E−07 | −2.2060881E−08 | 3.9186524E−06 |
| A8 | 4.7229072E−09 | −3.8176199E−08 | −2.5866656E−06 |
| A9 | 3.0075226E−09 | 4.5275216E−10 | 1.0982577E−07 |
| A10 | 6.2080009E−11 | 3.1756049E−10 | 2.8857763E−08 |
| A11 | −6.3243924E−12 | 1.1465233E−11 | 8.1427116E−09 |
| A12 | −2.4850129E−12 | −1.9473382E−12 | −2.9736430E−10 |
| A13 | 8.0419436E−14 | −1.9014716E−13 | 2.3113804E−10 |
| A14 | 8.8124842E−15 | 8.1969666E−17 | −1.4130071E−10 |
| A15 | 6.0094430E−16 | 9.0235118E−16 | −4.3001217E−11 |
| A16 | −7.0733966E−17 | 9.8768185E−17 | 3.1733889E−12 |
| A17 | −1.2852645E−18 | 5.5436632E−18 | 1.0668616E−12 |
| A18 | 3.2661649E−20 | −6.3178638E−19 | 3.3926052E−13 |
| A19 | 2.2420068E−21 | −1.3095242E−19 | 1.1262584E−14 |
| A20 | 2.6378131E−22 | 8.4066924E−21 | −1.3598628E−14 |

| Surface Number | 14 | 17 | 18 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 1.4179500E−04 | 5.9161845E−04 | 8.2242216E−04 |
| A5 | −1.2397788E−04 | −2.5914484E−05 | −1.9231298E−04 |
| A6 | 2.4342531E−05 | −3.4438878E−05 | 1.7878431E−05 |
| A7 | −6.0032094E−06 | 5.3377134E−06 | 2.4615950E−07 |
| A8 | 2.2340007E−06 | 7.5589025E−07 | 3.4837013E−08 |
| A9 | 1.4487974E−07 | −5.3228108E−08 | 1.0042287E−09 |
| A10 | −6.2753506E−08 | −2.9220329E−08 | −3.3265004E−10 |
| A11 | −2.4291246E−08 | −5.8709293E−10 | −1.4951082E−09 |
| A12 | −5.1651402E−11 | 3.2437211E−10 | −1.5798047E−10 |
| A13 | 4.2994810E−10 | 2.7232638E−12 | 1.7045793E−11 |
| A14 | 2.8924537E−10 | 1.0562710E−11 | 1.0099131E−11 |
| A15 | 8.8793125E−12 | −4.0411353E−13 | 1.5099117E−12 |
| A16 | −6.7432630E−12 | 3.2482397E−13 | −2.9004804E−13 |
| A17 | −3.4371478E−12 | −5.2122069E−14 | −3.6414197E−14 |
| A18 | 1.8149763E−13 | −6.8919262E−15 | −1.2249800E−15 |
| A19 | 1.7801472E−13 | −4.2922593E−16 | 1.2984660E−15 |
| A20 | −2.0676419E−14 | 1.7614142E−16 | −7.4672483E−17 |

Figure 5:
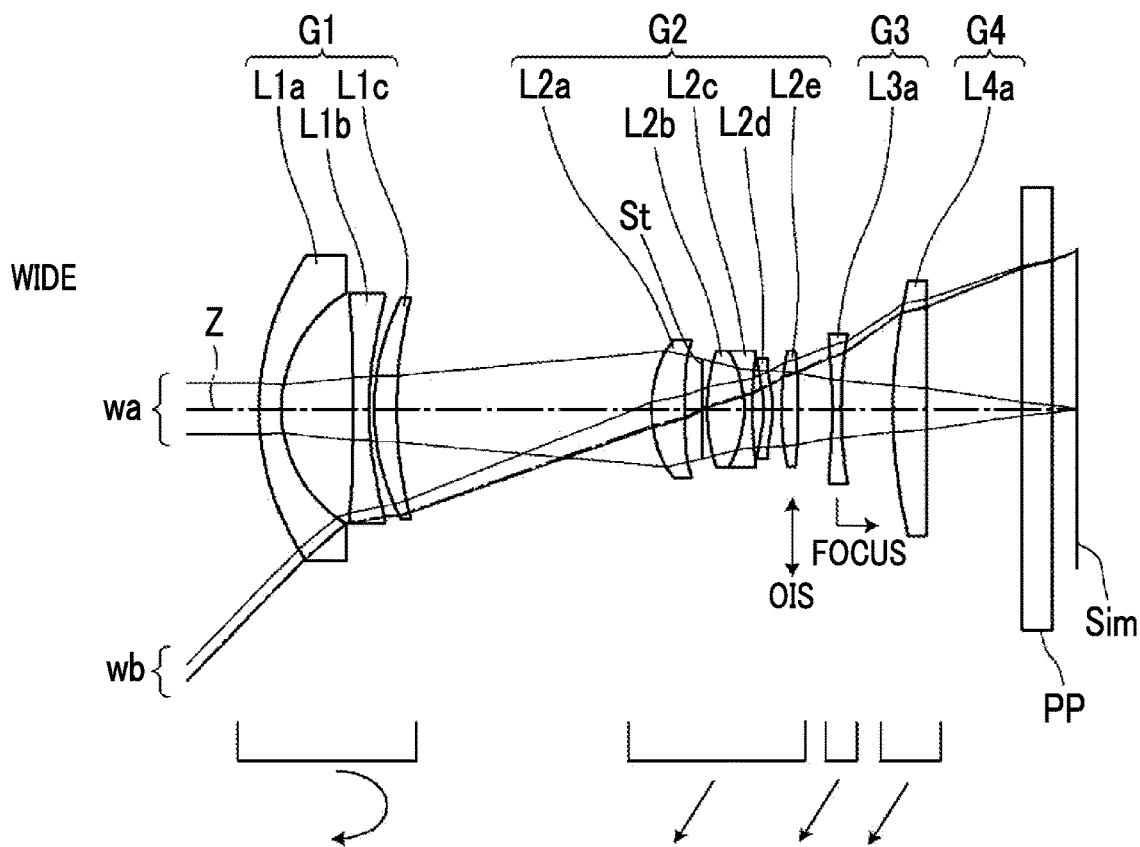
FIG. 5 is a cross-sectional view illustrating a lens configuration of a zoom lens of Example 5 of the present invention.
Figure 5:
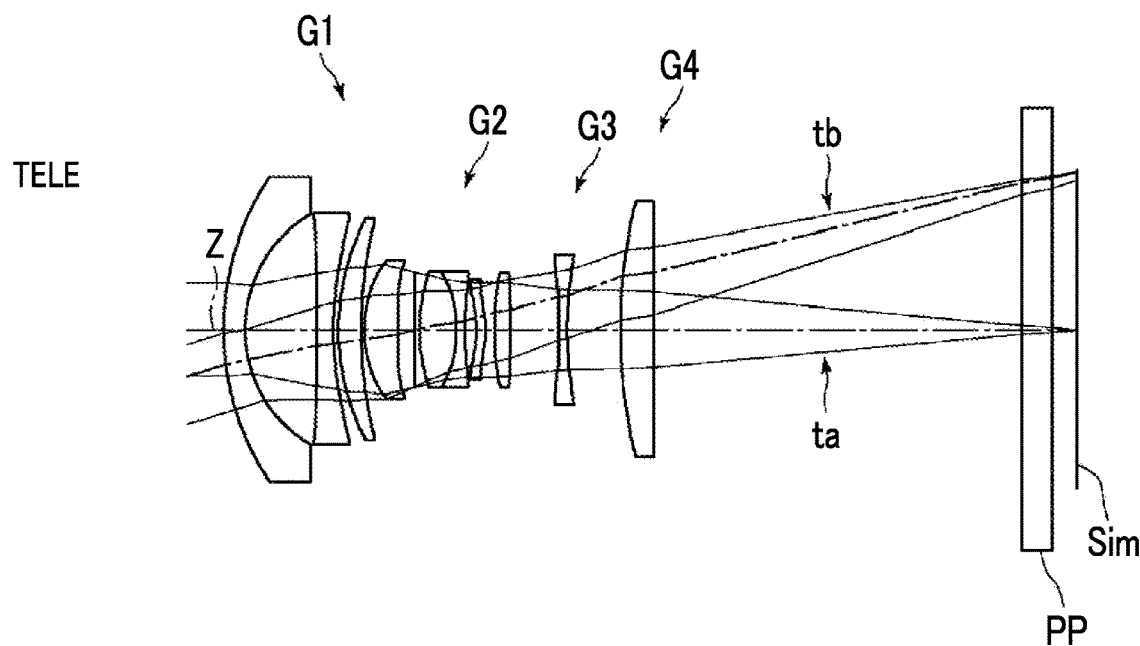
Figure 14:
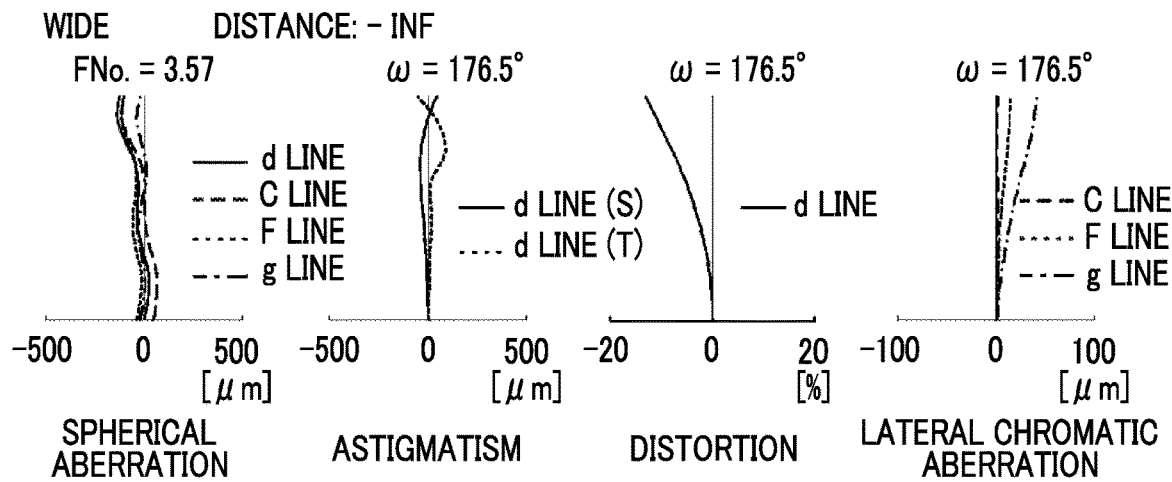
FIG. 14 is a diagram of aberrations of the zoom lens of Example 5 of the present invention during focusing on the object at infinity.
Figure 14:
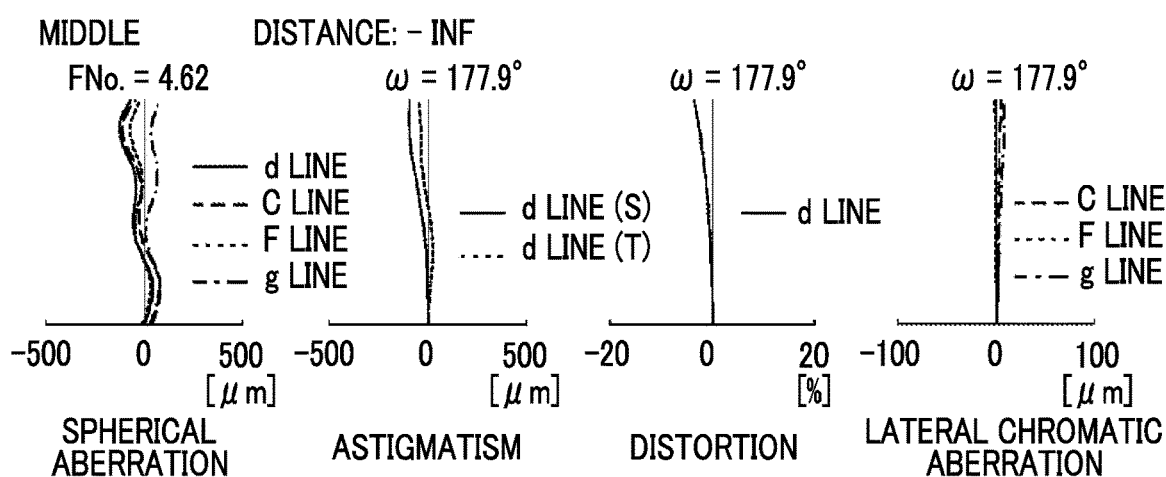
Figure 14:
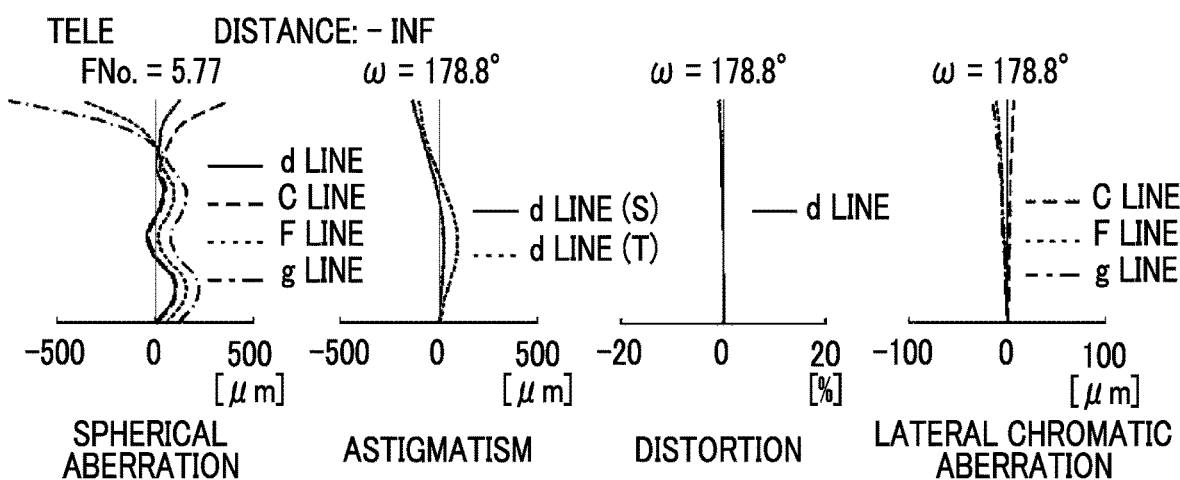
Figure 15:
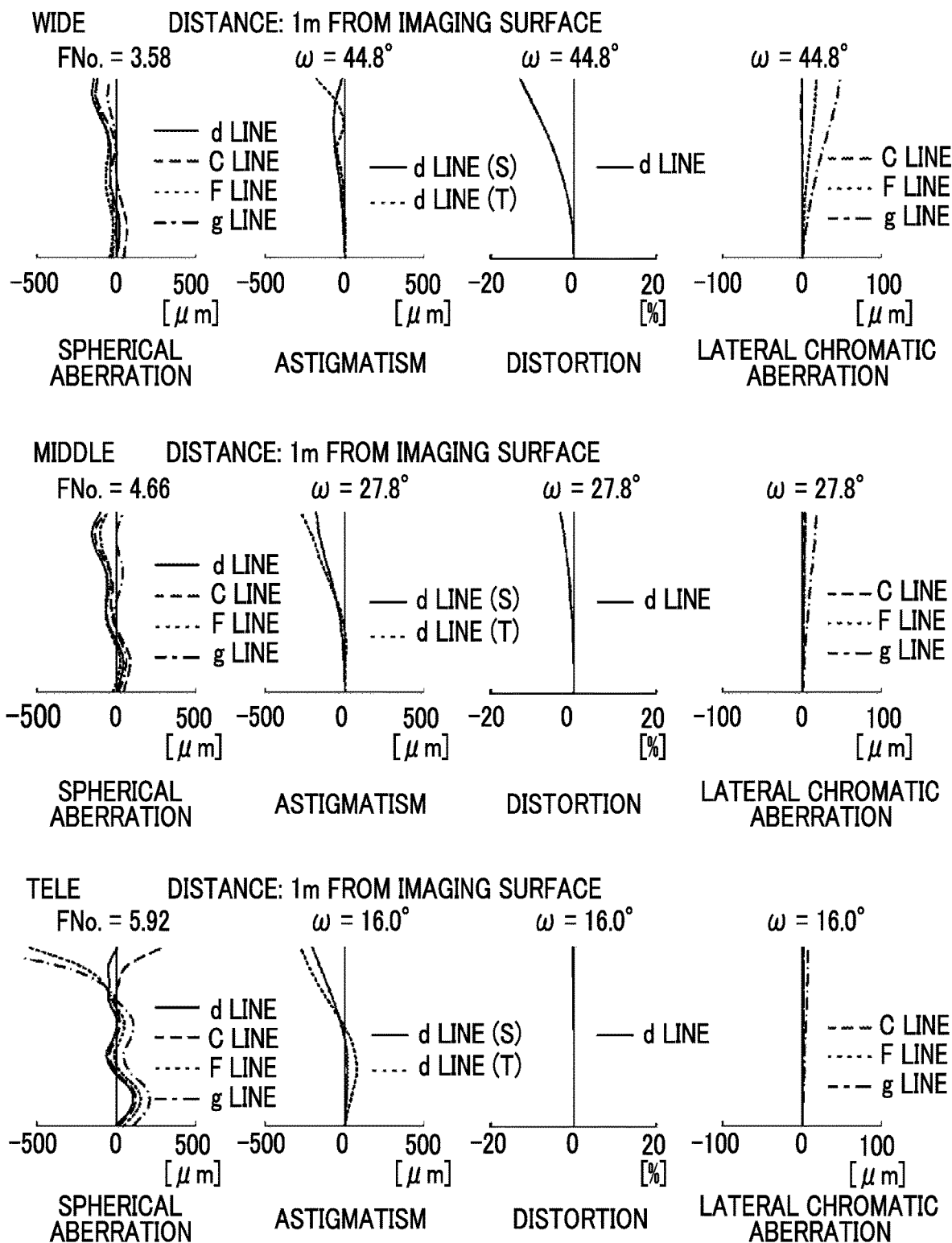
FIG. 15 is a diagram of aberrations of the zoom lens of Example 5 of the present invention during focusing on the object at a finite distance.

Next, a zoom lens of Example 5 will be described. FIG. 5 is a cross-sectional view illustrating a lens configuration of the zoom lens of Example 5. The group configuration of the zoom lens of Example 5 is the same as that of the zoom lens of Example 1. However, the configuration is made such that all the lens groups of the first lens group G1, the second lens group G2, the third lens group G3, and the fourth lens group G4 move during zooming. Table 17 shows basic lens data of the zoom lens of Example 5, Table 18 shows data about specification, Table 19 shows data about surface distances which are variable, Table 20 shows data about aspheric surface coefficients thereof, FIG. 14 shows aberration diagrams during focusing on the object at infinity, and FIG. 15 shows aberration diagrams during focusing on the object at a finite distance (focusing on the object at a distance of 1 m from the image plane).

TABLE 17

Example 5 Lens Data (n and ν are based on d line)

| Surface Number | Radius of Curvature | Surface Distance | n | ν |
|---|---|---|---|---|
| 1 | 23.877 | 2.05 | 2.00100 | 29.13 |
| 2 | 11.905 | 6.75 | | |
| *3 | −476.708 | 1.50 | 1.53586 | 56.06 |
| *4 | 27.069 | 0.50 | | |
| 5 | 20.726 | 2.12 | 1.95906 | 17.47 |
| 6 | 37.252 | DD[6] | | |
| *7 | 11.490 | 3.12 | 1.76450 | 49.10 |
| *8 | 54.267 | 1.61 | | |
| 9(Stop) | ∞ | 0.50 | | |
| 10 | 16.129 | 3.51 | 1.49700 | 81.61 |
| 11 | −10.147 | 0.75 | 1.80610 | 33.27 |
| 12 | 29.173 | 1.12 | | |
| *13 | −8.633 | 0.82 | 1.88385 | 37.20 |
| *14 | −10.047 | 0.87 | | |
| 15 | 26.134 | 1.57 | 1.52638 | 60.20 |
| 16 | −54.939 | DD[16] | | |
| 17 | −46.132 | 0.74 | 1.59551 | 39.22 |
| 18 | 36.715 | DD[18] | | |
| 19 | 47.127 | 3.12 | 1.95375 | 32.32 |
| 20 | ∞ | DD[20] | | |
| 21 | ∞ | 2.85 | 1.51633 | 64.14 |
| 22 | ∞ | DD[22] | | |

TABLE 18

Example 5 Specification (d Line)

| Focusing on Object at Infinity | | | |
|---|---|---|---|
| | WIDE | MID | TELE |
| Zoom Magnification | 1.0 | 1.7 | 3.0 |
| f' | 16.45 | 27.67 | 48.53 |
| Bf' | 13.32 | 22.82 | 39.06 |
| FNo. | 3.57 | 4.62 | 5.77 |
| 2ω[°] | 89.8 | 56.0 | 32.8 |

| Focusing on Object at Finite Distance | | | |
|---|---|---|---|
| | WIDE | MID | TELE |
| Zoom Magnification | 1.0 | 1.7 | 3.0 |
| f' | 16.35 | 27.38 | 47.68 |
| Bf' | | | |
| FNo. | 3.58 | 4.66 | 5.92 |
| 2ω[°] | 89.6 | 55.6 | 32.0 |

TABLE 19

Example 5 Moved Surface Distance

| Focusing on Object at Infinity | | | |
|---|---|---|---|
| | WIDE | MID | TELE |
| DD[6] | 23.99 | 9.54 | 0.34 |
| DD[16] | 3.25 | 3.40 | 4.53 |
| DD[18] | 4.92 | 4.92 | 4.92 |
| DD[20] | 9.06 | 18.57 | 34.81 |
| DD[22] | 2.38 | 2.38 | 2.38 |

| Focusing on Object at Finite Distance | | | |
|---|---|---|---|
| | WIDE | MID | TELE |
| DD[6] | 23.99 | 9.54 | 0.34 |
| DD[16] | 3.53 | 3.98 | 5.90 |

TABLE 19-continued

Example 5 Moved Surface Distance

| DD[18] | 4.64 | 4.34 | 3.55 |
|---|---|---|---|
| DD[20] | 9.06 | 18.57 | 34.81 |
| DD[22] | 2.38 | 2.38 | 2.38 |

TABLE 20

Example 5 Aspheric surface coefficient

| Surface Number | 3 | 4 | 7 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −1.2479530E−05 | −5.1298041E−05 | 7.7147143E−05 |
| A5 | −3.0316220E−05 | −1.2965016E−05 | −2.6385146E−05 |
| A6 | 8.1777812E−06 | 2.6033380E−06 | 7.7523908E−06 |
| A7 | −7.7340575E−07 | 1.0770292E−07 | −4.6734700E−07 |
| A8 | 5.4625150E−09 | −3.8809505E−08 | −4.4154284E−08 |
| A9 | 3.3452881E−09 | −3.7835635E−10 | 6.5528241E−09 |
| A10 | 3.1971022E−11 | 2.5368943E−10 | 1.9027167E−09 |
| A11 | −1.1589373E−11 | 1.2059422E−11 | 2.2960060E−12 |
| A12 | −2.7993715E−12 | −1.7620815E−12 | 8.1500169E−12 |
| A13 | 9.9664751E−14 | −1.2627438E−13 | −6.4020028E−12 |
| A14 | 1.3558699E−14 | 4.0908393E−15 | −7.4285402E−13 |
| A15 | 1.1168514E−15 | 9.7401150E−16 | 2.6483395E−14 |
| A16 | −5.8423449E−17 | 8.2346673E−17 | 5.4557374E−15 |
| A17 | −3.7971760E−18 | 1.9525918E−18 | 3.1331559E−15 |
| A18 | −4.2047649E−19 | −9.9014622E−19 | 5.8332642E−16 |
| A19 | −2.7055286E−20 | −1.3344325E−19 | 1.6786304E−17 |
| A20 | 4.3481825E−21 | 1.1644509E−20 | −1.6461745E−17 |
| A21 | | | 0.0000000E+00 |

| Surface Number | 8 | 13 | 14 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 1.1037934E−04 | 1.1444595E−03 | 1.1919682E−03 |
| A5 | −7.1122564E−05 | 3.5962827E−05 | −1.2558675E−04 |
| A6 | 2.4506177E−05 | 1.0123736E−05 | 8.8635425E−05 |
| A7 | −1.5338888E−06 | 5.0340715E−06 | −1.1365084E−05 |
| A8 | −3.3192903E−07 | −6.8463693E−07 | −5.5198713E−07 |
| A9 | 2.6004908E−09 | −3.5821916E−08 | 1.0649835E−07 |
| A10 | 8.0860435E−09 | −2.8368475E−08 | 3.7195016E−08 |
| A11 | 1.1450405E−09 | 5.4375290E−09 | −9.9831982E−11 |
| A12 | 7.1485033E−11 | −4.9487739E−10 | 1.4809940E−09 |
| A13 | −2.2322148E−11 | 5.8968748E−10 | −9.5662707E−11 |
| A14 | −7.7361700E−12 | −1.1217296E−10 | −5.6300371E−11 |
| A15 | −6.2077819E−13 | −3.4163229E−11 | −2.1563359E−11 |
| A16 | 6.6666894E−15 | 2.7548335E−13 | −7.0897114E−12 |
| A17 | 2.3471469E−14 | 1.0592286E−12 | −1.5829873E−12 |
| A18 | 5.7497842E−15 | 2.8216735E−13 | 6.7727584E−13 |
| A19 | 7.6310698E−16 | 6.3675693E−15 | 2.3045500E−13 |
| A20 | −2.2242802E−16 | −1.0458495E−14 | −4.4001412E−14 |
| A21 | 0.0000000E+00 | | |

Table 21 shows values corresponding to Conditional Expressions (1) to (8) of the zoom lenses of Examples 1 to 5. It should be noted that, in the above-mentioned examples, the d line is set as the reference wavelength, and the values shown in Table 21 are values at the reference wavelength.

TABLE 21

| Expression Number | Conditional Expression | Example 1 | Example 2 | Example 3 | Example 4 | Example 5 |
|---|---|---|---|---|---|---|
| (1) | Nd1 − 0.0037 × vd1 | 1.83 | 1.78 | 1.83 | 1.83 | 1.89 |
| (2) | Nd3 − 0.0037 × vd3 | 1.88 | 1.88 | 1.88 | 1.88 | 1.89 |
| (3) | fw/f3 | −0.45 | −0.27 | −0.40 | −0.48 | −0.48 |
| (4) | Bf/IH | 0.74 | 0.74 | 0.76 | 0.95 | 0.81 |
| (5) | Bf/f4 | 0.23 | 0.19 | 0.21 | 0.27 | 0.27 |
| (6) | ft/fois | 1.15 | 1.02 | 1.23 | 1.19 | 1.43 |
| (7) | vud | 64.14 | 81.61 | 81.61 | 64.14 | 60.20 |
| (8) | Δvcd | 31.23 | 31.23 | 39.00 | 31.23 | 48.34 |

As can be seen from the above data, all the zoom lenses of Examples 1 to 5 are zoom lenses each of which satisfies Conditional Expressions (1) to (8), and each of which is capable of achieving high optical performance over the entire object distance with little fluctuation in aberrations caused by the object distance while being able to perform high speed focusing with a small size and a lightweight as a whole.

Figure 16:
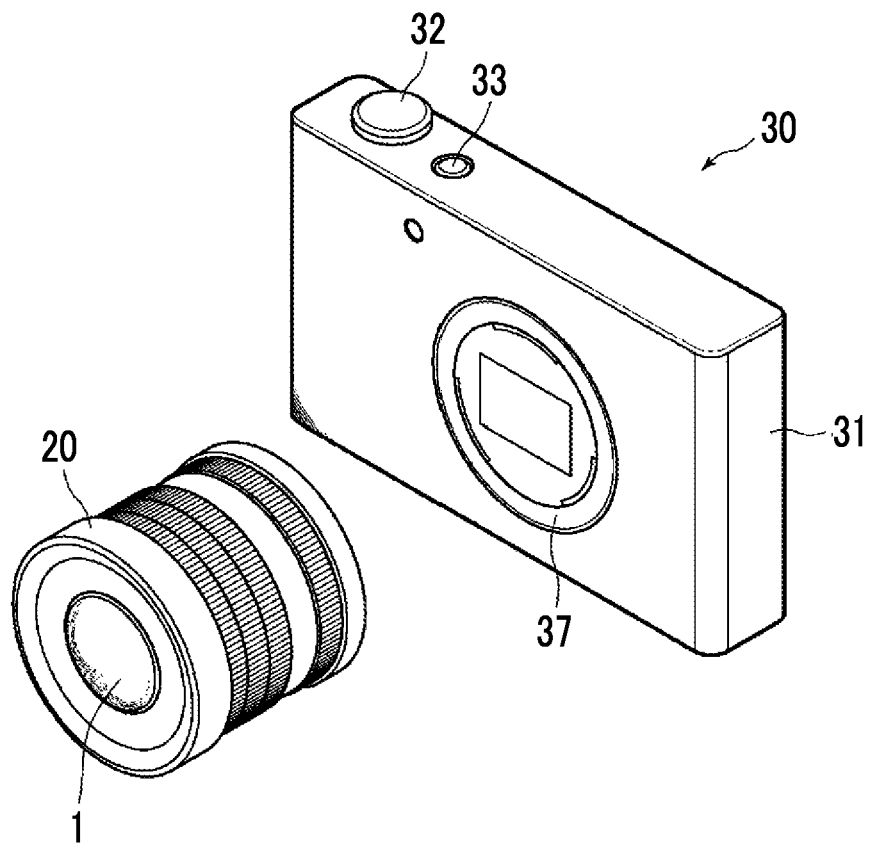
FIG. 16 is a perspective view illustrating the front side of an imaging apparatus according to an embodiment of the present invention.
Figure 17:
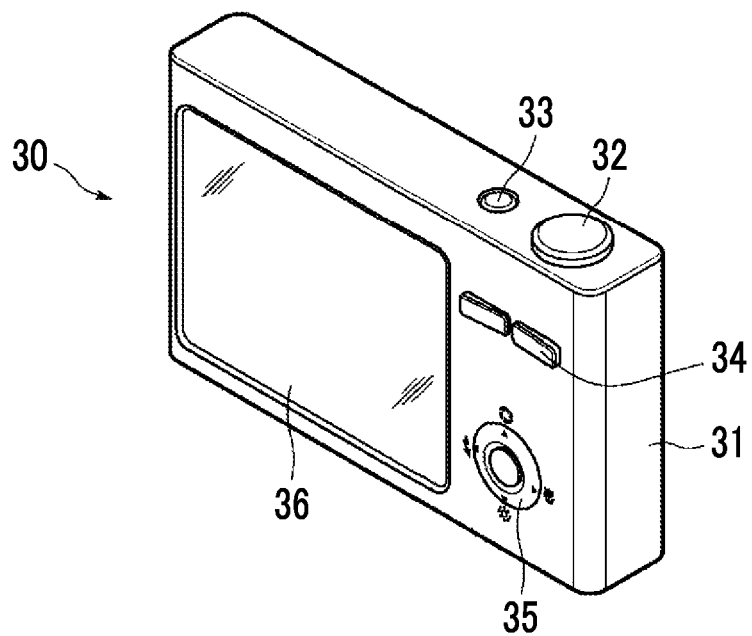
FIG. 17 is a perspective view illustrating the rear side of the imaging apparatus of FIG. 16.

Next, an embodiment of the imaging apparatus according to the present invention will be described with reference to FIGS. 16 and 17. In FIGS. 16 and 17, a camera 30, which is obliquely viewed respectively on the front side and the rear side, is a non-reflex (so-called mirrorless) type digital camera on which an interchangeable lens 20 housing the zoom lens 1 according to the above-mentioned embodiment of the present invention in a lens barrel is detachably mounted.

The camera 30 comprises a camera body 31, and a shutter button 32 and a power button 33 are provided on an upper surface thereof. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element (not shown in the drawing), a signal processing circuit, a recording medium, and the like. The imaging element such as a charge coupled device (CCD) outputs a captured image signal based on a subject image which is formed through the interchangeable lens 20. The signal processing circuit generates an image through processing of the captured image signal which is output from the imaging element. The recording medium records the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the examples, and different values may be used therefor.

In the above-mentioned embodiment of the imaging apparatus, the non-reflex type digital camera is taken as an example and described with the drawings. However, the imaging apparatus of the present invention is not limited to this. For example, the present invention may be applied to imaging apparatuses such as video cameras, digital cameras which are not the non-reflex type, movie imaging cameras, broadcast cameras.

EXPLANATION OF REFERENCES

1: zoom lens
20: interchangeable lens
30: camera
31: camera body
32: shutter button
33: power button
34, 35: operation section
36: display section
37: mount
FOCUS: focusing lens group
G1: first lens group
G2: second lens group
G3: third lens group
G4: fourth lens group
L1a to L4a: lens
OIS: vibration reduction lens group
PP: optical member
Sim: image plane
St: aperture stop
ta: on-axis rays at wide-angle end
tb: rays with the maximum angle of view at telephoto end
wa: on-axis rays at wide-angle end
wb: rays with the maximum angle of view at wide-angle end
Z: optical axis

What is claimed is:

1. A zoom lens consisting of:
four or fewer lens groups, comprising a first lens group that has a negative refractive power and a second lens group that has a positive refractive power, in order from an object side,
wherein during zooming, distances between adjacent groups in a direction of an optical axis are changed due to movement of at least the first lens group,
wherein the first lens group consists of a lens that has a convex surface toward the object side and has a negative refractive power, a biconcave lens, and a positive lens that has a convex surface toward the object side, in order from the object side,
wherein the second lens group has at least a lens that has a concave surface toward an image side, a stop, a biconvex lens, and a negative lens that has a concave surface toward the image side, successively in order from the object side,
wherein the second lens group has only one cemented lens,
wherein a cemented surface of the cemented lens of the second lens group has a shape convex toward the image side,
wherein a lens group closest to the image side in the zoom lens remains stationary during zooming, and
wherein the lens group closest to the image side in the zoom lens consists of one positive lens.

2. The zoom lens according to claim 1,
wherein the zoom lens consists of the first lens group, the second lens group, a third lens group that has a negative refractive power; and a fourth lens group that has a positive refractive power.

3. The zoom lens according to claim 2,
wherein a lens closest to the object side in the third lens group has a concave surface toward the object side, and
wherein during focusing, only the third lens group moves along the optical axis.

4. An imaging apparatus comprising a zoom lens:
wherein the zoom lens consists of four or fewer lens groups, comprising a first lens group that has a negative refractive power and a second lens group that has a positive refractive power, in order from an object side,
wherein during zooming, distances between adjacent groups in a direction of an optical axis are changed due to movement of at least the first lens group,
wherein the first lens group consists of a lens that has a convex surface toward the object side and has a negative refractive power, a biconcave lens, and a positive lens that has a convex surface toward the object side, in order from the object side,
wherein the second lens group has at least a lens that has a concave surface toward an image side, a stop, a biconvex lens, and a negative lens that has a concave surface toward the image side, successively in order from the object side,
wherein the second lens group has only one cemented lens,
wherein a cemented surface of the cemented lens of the second lens group has a shape convex toward the image side,
wherein a lens group closest to the image side in the zoom lens remains stationary during zooming, and
wherein the lens group closest to the image side in the zoom lens consists of one positive lens.

5. The imaging apparatus according to claim 4,
wherein the zoom lens consists of the first lens group, the second lens group, a third lens group that has a negative refractive power; and a fourth lens group that has a positive refractive power.

6. The imaging apparatus according to claim 5,
wherein a lens closest to the object side in the third lens group has a concave surface toward the object side, and
wherein during focusing, only the third lens group moves along the optical axis.

* * * * *